(12) United States Patent
Li et al.

(10) Patent No.: US 8,213,707 B2
(45) Date of Patent: Jul. 3, 2012

(54) SYSTEM AND METHOD FOR 3D MEASUREMENT AND SURFACE RECONSTRUCTION

(75) Inventors: You Fu Li, New Territories (HK); Sheng Yong Chen, Hangzhou (CN)

(73) Assignee: City University of Hong Kong, Hong Kong (HK)

( * ) Notice: Subject to any disclaimer, the term of this patent is extended or adjusted under 35 U.S.C. 154(b) by 0 days.

(21) Appl. No.: 12/269,124

(22) Filed: Nov. 12, 2008

(65) Prior Publication Data

US 2009/0102840 A1    Apr. 23, 2009

Related U.S. Application Data

(63) Continuation of application No. 10/891,632, filed on Jul. 15, 2004, now abandoned.

(51) Int. Cl.
G06K 9/00 (2006.01)
G06T 15/00 (2006.01)
G06T 17/00 (2006.01)
G06T 15/40 (2006.01)

(52) U.S. Cl. ......... 382/154; 345/419; 345/420; 345/421

(58) Field of Classification Search .......... 345/419–421; 382/154
See application file for complete search history.

(56) References Cited

U.S. PATENT DOCUMENTS 5,831,621 A    11/1998 Pito

OTHER PUBLICATIONS

Chen, S. et al., "A 3D Vision System Using Unique Color Encoding", Proceedings of the 2003 IEEE International Conference on Robotics, Intelligent Systems and Signal Processing, Changsha, China, Oct. 2003.*
Chen et al., "Self recalibration of a structured light vision system from a single view," Proceedings of the 2002 IEEE International Conference on Robotics & Automation, Washington DC, May 2002.*
Chen et al., "Self-recalibration of a colour-encoded light system for automated three-dimensional measurements," Measurement Science and Technology, vol. 14, pp. 33-40, Jan. 2003.*

(Continued)

*Primary Examiner* — Anand Bhatnagar
*Assistant Examiner* — Soo Park
(74) *Attorney, Agent, or Firm* — David E. Rook; Hoffman Warnick LLC

(57) ABSTRACT

A system and method for measuring and surface reconstruction of a 3D image of an object comprises a projector arranged to project a pattern onto a surface of an object to be imaged; and a processor stage arranged to examine distortion or distortions produced in the pattern by the surface. The processor stage is arranged to convert by, for example, a triangulation process the distortion or distortions produced in the pattern by the surface to a distance representation representative of the shape of the surface. The processor stage is also arranged to reconstruct electronically the surface shape of the object.

36 Claims, 7 Drawing Sheets

Geometrical relations in the vision system

OTHER PUBLICATIONS

Okatani et al., "Autocalibration of a projector-screen-camera system: theory and algorithm for screen-to-camera homography estimation," Proceedings of the Ninth IEEE International Conference on Computer Vision, 2003.*

Lavoie et al., "A high precision 3D object reconstruction method using a color coded grid and NURBS," Proceedings of the International Conference on Image Analysis and Processing, 1999.*

Y. F. Li et al; "Automatic Recalibration of an Active Structured Light Vision System", pp. 259-268, Apr. 2003.

M. A. G. Izquierdo et al.; "Sub-Pixel Measurement of 3D Surfaces by Laser Scanning", pp. 1-8, Oct. 1998.

C. Sinlapeecheewa et al.; "3D Profile Measurement by Color Pattern Projection and System Calibration", pp. 405-410 2002.

Z.G. Liu et al., "Information Entropy Based Viewpoint Planning for Digitization of 3D Objects", pp. 1509-1514, Jul. 2003.

* cited by examiner

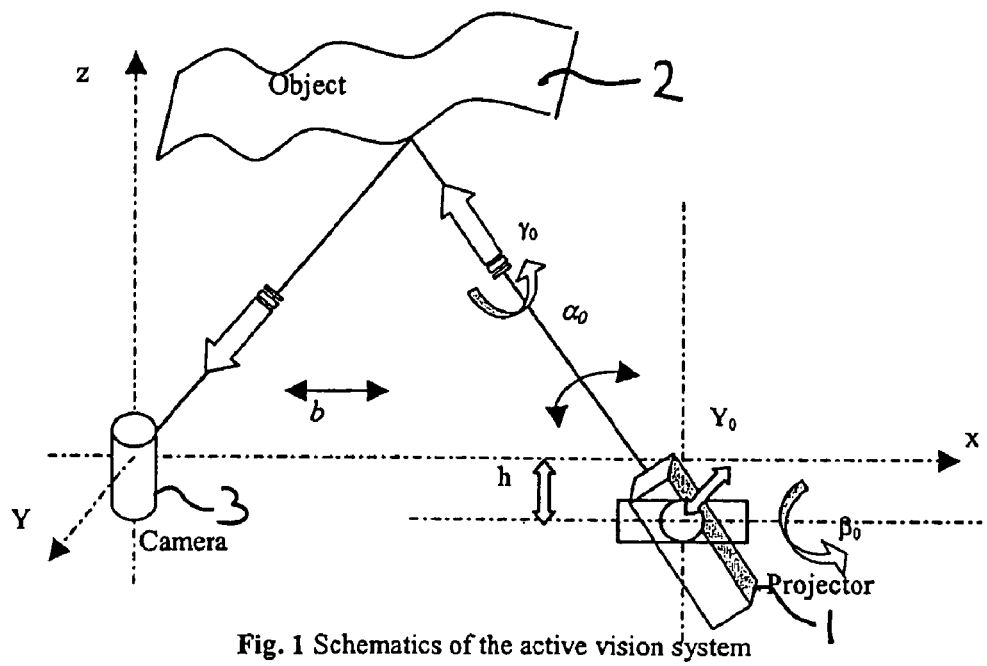
Fig. 1 Schematics of the active vision system
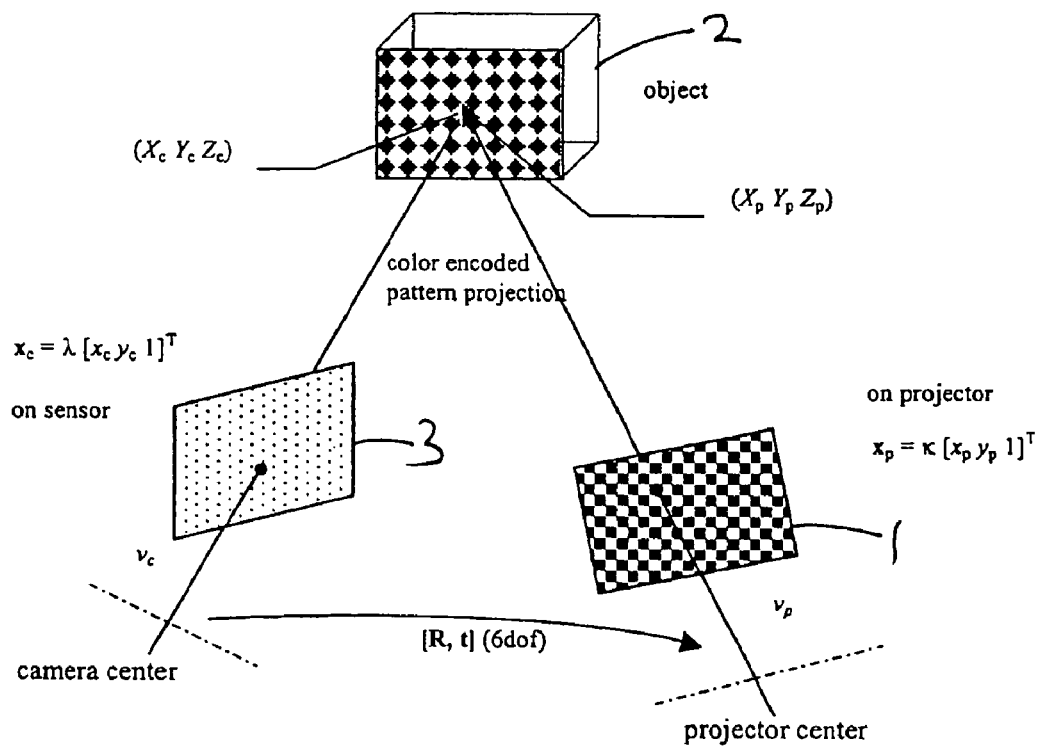
Fig. 2 Geometrical relations in the vision system

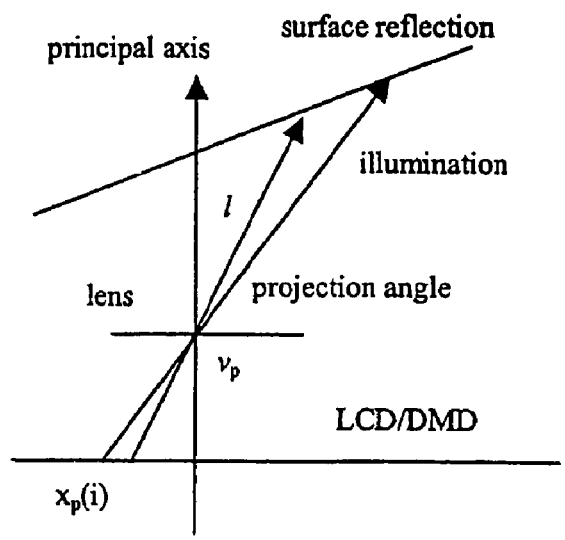
Fig. 3 The illumination projection
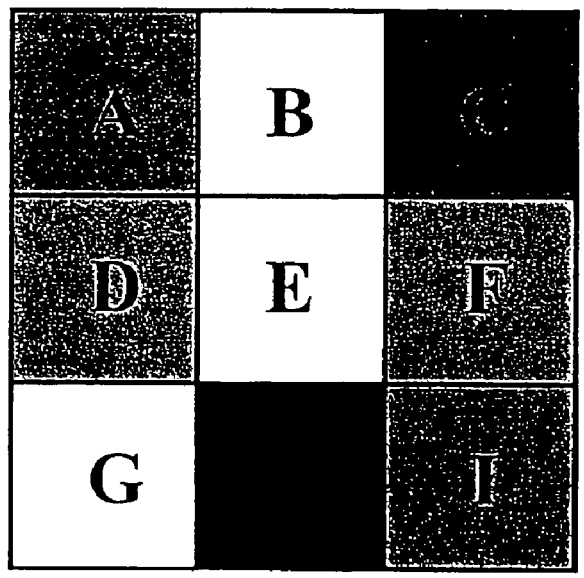
Fig 4. Color encoding for identification of coordinates on the projector

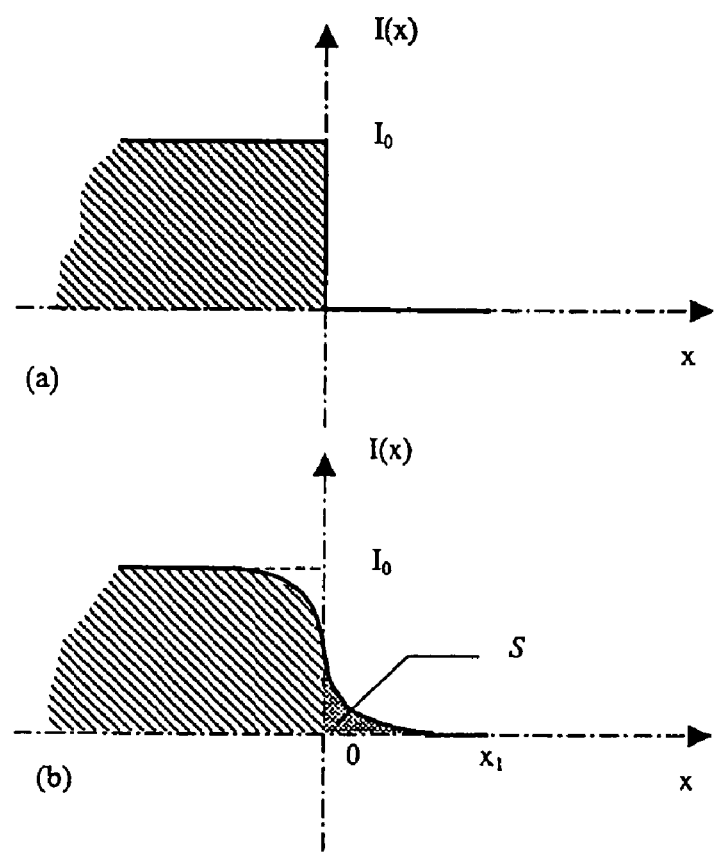
(a) Ideal step illumination curve; (b) Out-of-focus blur and irradiated area.
Fig. 5 The blur area and its irradiant flux

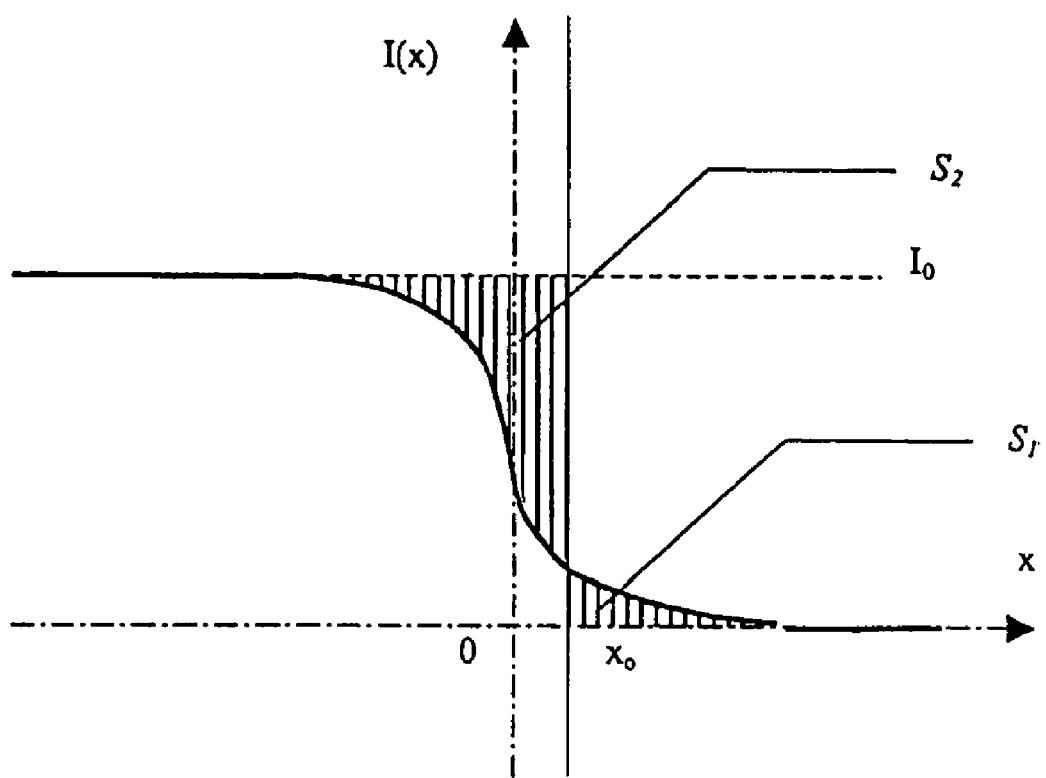
Fig. 6 Determination of the blur radius

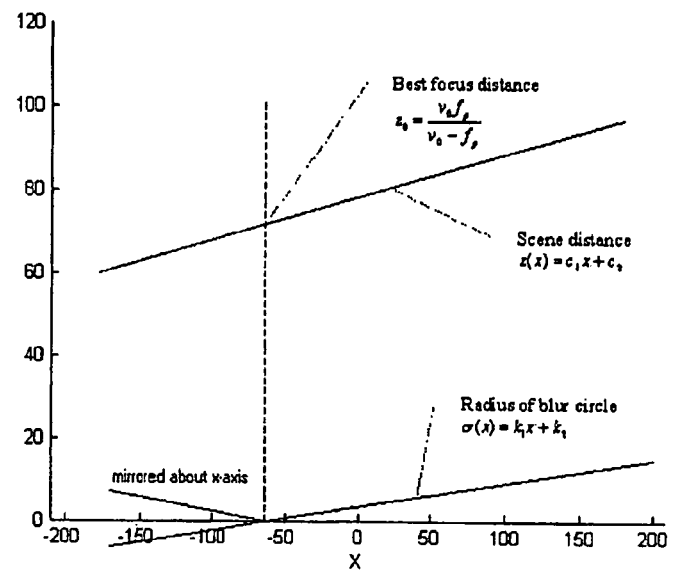
Fig. 7 Determination of the best-focused location
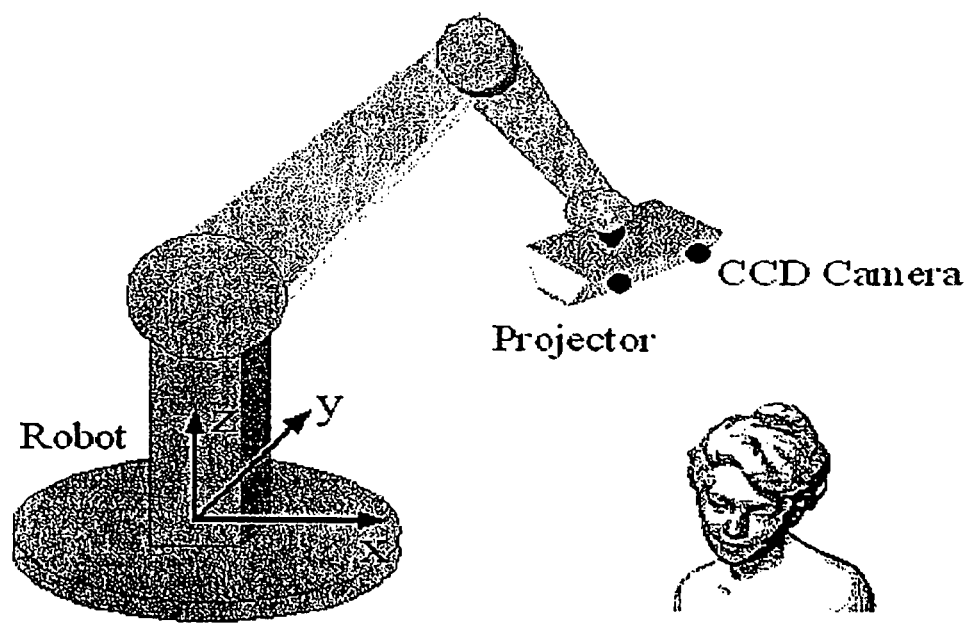
Fig. 8 System setup

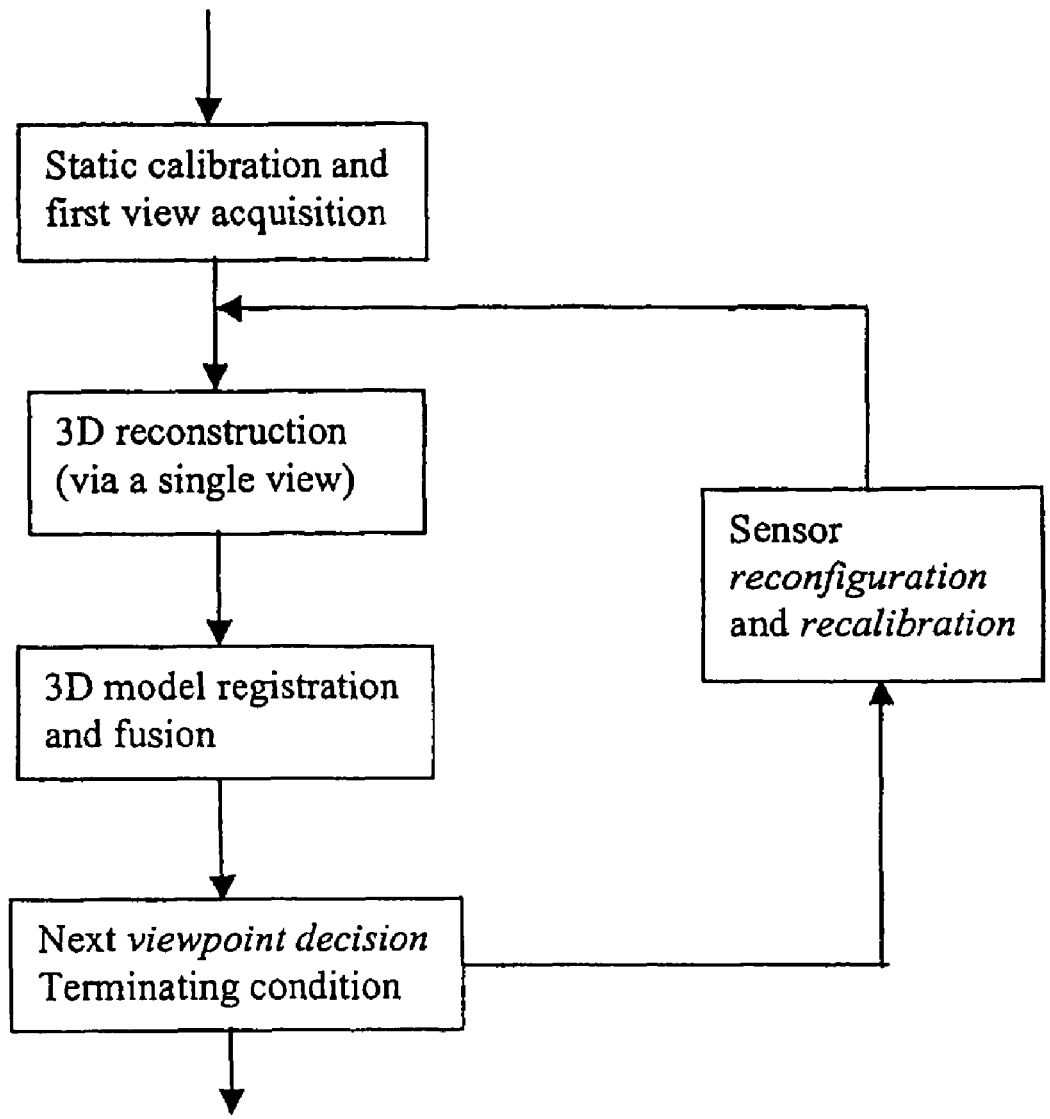
Fig. 9 A view planning strategy

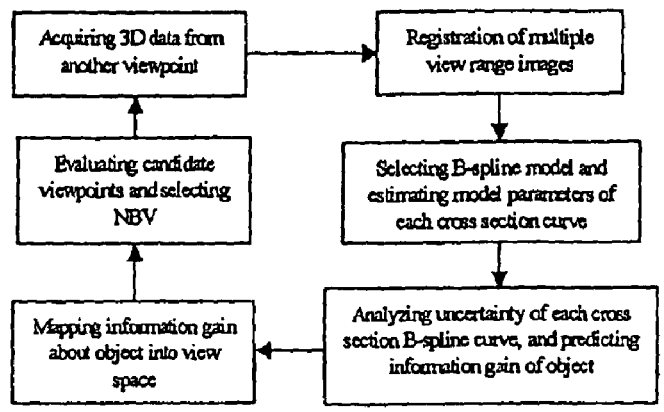
Fig. 10 Information entropy based viewpoint planning for digitization of 3D object
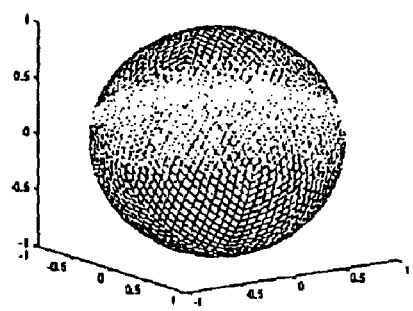
Fig. 11a View space with Q=16
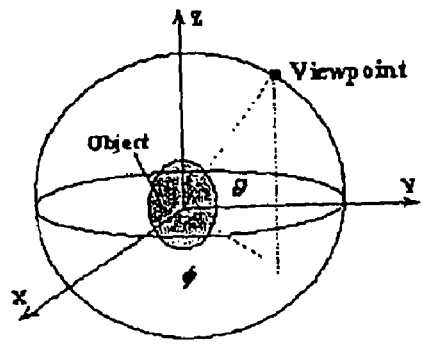
Fig. 11b Viewpoint representation

SYSTEM AND METHOD FOR 3D MEASUREMENT AND SURFACE RECONSTRUCTION

CONTINUATION APPLICATION

This continuation application claims priority to U.S. patent application Ser. No. 10/891,632 entitled A SYSTEM AND METHOD FOR 3D MEASUREMENT AND SURFACE RECONSTRUCTION, filed on Jul. 15, 2004 now abandoned, the contents of which are hereby incorporated by reference in their entirety.

FIELD OF THE INVENTION

The present invention relates to a system and method for 3D measurement and surface reconstruction of an image reconfigurable vision, and in particular to a reconfigurable vision system and method.

BACKGROUND OF THE INVENTION

In many practical applications, such as reverse engineering, robotic exploration/navigation in clustered environments, model construction for virtual reality, human body measurements, and advanced product inspection and manipulation by robots, the automatic measurement and reconstruction of 3D shapes with high speed and accuracy is of critical importance. Currently, the devices widely used in industry for obtaining 3D measurements involve the mechanical scanning of a scene, for example in a laser scanning digitizer, which inevitably makes the measurement a slow process. Some advanced active vision systems using structured lighting have been explored and built. However, the existing systems lack the ability to change their settings, to calibrate by themselves and to reconstruct the 3D scene automatically.

To reconstruct a complete and accurate 3D model of an unknown object, two fundamental issues must be addressed. The first issue is how to acquire the 3D data for reconstructing the object surface. Currently, a laser range finder/scanner [1] is widely used for 3D surface data acquisition in industry. However, due to the mechanical scanning involved, the acquisition speed is limited. To increase the efficiency in the 3D imaging, pattern projections can be employed [2]. Portable 3D imaging systems based a similar principle have also been designed recently.

The second issue is how to determine the next viewpoint for each view so that all the information about the object surface can be acquired in an optimal way. This is also known as the NBV (Next Best View) problem, which determines the sensor direction (or pose) in the reconstruction process. The problem of viewpoint planning [3] for digitalization of 3D objects can be treated in different ways depending on whether or not the object's geometry is known beforehand [4,5]. For an unknown object, since the number of viewpoints and their viewing direction are unknown or cannot be determined prior to data acquisition, conventional 3D reconstruction processes typically involve an incremental iterative cycle of viewpoint planning, digitizing, registration and view integration and is conventionally based on a partial model reconstructed thus far. Based on a partial model reconstructed, the NBV algorithm then provides quantitative evaluations on the suitability of the remaining viewpoints. The evaluation for each viewpoint is based on all visible surface elements of the object that can be observed. The viewpoint with the highest visibility (evaluation score) is selected as the NBV.

In general, there are two fundamental problems to be solved when determining the Next Best View. The first problem is to determine the areas of the object which need to be sensed next and the second is to determine how to position the sensor to sample those areas. As there is no prior knowledge about the object, it is impossible to obtain a complete description of an object when occlusion occurs. Therefore, it is not generally possible to obtain precisely the invisible portions from either the current viewpoint or the acquired partial description of the object, so only an estimation of the Next Best View may be derived.

Various Next Best View algorithms have been proposed to date, for example Connolly [6] uses octree to represent object space, and the regions that have been scanned are labeled as seen, regions between the sensor and the surface are labeled as empty and all other regions are labeled as unseen. A set of candidate viewpoints is enumerated at fixed increments around the object. The Next Best View is calculated based on the evaluation of the visibility of each candidate viewpoint. This algorithm is computationally expensive and it does not incorporate the sensor geometry.

Maver and Bajesy [7] presented a solution to the NBV problem for a specific scanning setup consisting of an active optical range scanner and a turntable. In this document, unseen regions of the objects are represented as polygons. Visibility constraints for the sensor to view the unseen region are computed from the polygon boundaries. However, this solution is limited to a particular sensor configuration.

Pito [8] proposes an approach based on an intermediate position space representation of both sensor visibility constraints and unseen portions of the viewing volume. The NBV is determined as the sensor position that maximized the unseen portion of the object volume. This approach has been demonstrated to have achieved automatic viewpoint planning for a range sensor constrained to move on a cylindrical path around the object.

Whaite and Ferrie [9] use the superellipsoid model to represent an object and define a shell of uncertainty. The Next Best View is selected at the sensor position where the uncertainty of the current model fitted to the partial data points is the largest. This algorithm enables uncertainty-driven exploration of an object to build a model. However, the superellipsoid cannot accurately represent objects with a complex surface shape. Furthermore, surface visibility constraints were not incorporated in the viewpoint planning process.

Reed and Allen [10] propose a target-driven viewpoint planning method. The volume model is used to represent the object by extrusion and intersection operations. The constraints, such as sensor imaging constraints, model occlusion constraints and sensor placement constraints, are also represented as solid modeling volumes and are incorporated into the viewpoint planning. The algorithm involves expensive computation on the solid modeling and intersection operation.

Scott [11] considers viewpoint planning as integer programming. However, in this system the object must be scanned before viewpoint planning to obtain prior knowledge about an unknown object. Given a rough model of an unknown object, a sequential set of viewpoints is calculated to cover all surface patches of the object with registration constraint. However, the object must be scanned before viewpoint planning to obtain the prior knowledge about unknown objects.

In many applications, a vision sensor often needs to move from one place to another and change its configuration for perception of different object features. A dynamic reconfigurable vision sensor is useful in such applications to provide an active view of the features.

Active robot vision, in which a vision sensor can move from one place to another for performing a multi-view vision task, is an active research area. A traditional vision sensor with fixed structure is often inadequate for the robot to perceive the object's features in an uncertain environment as the object distance and size are unknown before the robot sees the object. A dynamically reconfigurable sensor may assist the robot in controlling the configuration and gaze at the object surfaces. For example, with a structured light system, the camera needs to see the object surface illuminated by the projector, to perform the 3D measurement and reconstruction task.

The system must be calibrated and traditionally, the calibration task is accomplished statically by manual operations. A calibration target/device is conventionally designed with a precision calibration fixture to provide a number of points whose world coordinates are precisely known [12]-[14]. With a planar calibration pattern, the target needs to be placed at several accurately known positions in front of the vision sensor. For dynamically reconfigurable vision systems, the vision system needs to have the ability of self-recalibration without requiring external 3D data provided by a precision calibration device.

Self-calibration of vision sensors has been actively researched in the last decade. However, most of the conventionally available methods were developed for calibration of passive vision systems such as stereo vision and depth-from-motion [15]-[22]. Conventionally these systems require dedicated devices for calibrating the intrinsic and extrinsic parameters of the cameras. Due to the special calibration target needed, such a calibration is normally carried out off-line before a task begins. In many practical applications, on-line calibration during the execution of a task is needed. Over the years, efforts have been made in research to achieve efficient on-line calibrations.

Maybank and Faugeras [23] suggested the calibration of a camera using image correspondences in a sequence of images from a moving camera. The kinds of constructions that could be achieved from a binocular stereo rig were further addressed in [24]. It was found that a unique projective representation of the scene up to an arbitrary projective transformation could be constructed if five arbitrary correspondences were chosen and an affine representation of the scene up to an arbitrary affine transformation could be constructed if four arbitrary correspondences were adopted.

Hartly [25] gave a practical algorithm for Euclidean reconstruction from several views with the same camera based on Levenberg-Marquardt Minimization. A new approach based on stratification was introduced in [26].

In this context, much work has been conducted in Euclidean reconstruction up to a transformation. Pollefeys et al [27] proposed a method to obtain a Euclidean reconstruction from images taken with an uncalibrated camera with variable focal lengths. This method is based on an assumption that although the focal length is varied, the principal point of the camera remains unchanged. This assumption limits the range of applications of this method. A similar assumption was also made in the investigations in [28,29]. In practice, when the focal length is changed (e.g. by zooming), the principal point may vary as well. In the work by Heyden and Astrom [30], they proved that it is possible to obtain Euclidean reconstruction up to a scale using an uncalibrated camera with known aspect ratio and skew parameters of the camera. A special case of a camera with Euclidean image plane was used for their study. A crucial step in the algorithm is the initialization which will affect the convergence. How to obtain a suitable initialization was still an issue to solve [31]. Kahl [32] presented an approach to self-calibration and Euclidean reconstruction of a scene, assuming an affine model with zero skew for the camera. Other parameters such as the intrinsic parameters could be unknown or varied. The reconstruction which needed a minimum of three images was an approximation and was up to a scale. Pollefeys et al gave the minimum number of images needed for achieving metric reconstruction, i.e. to restrict the projective ambiguity to a metric one according to the set of constraints available from each view [31].

The above-mentioned reconstruction methods are based on passive vision systems. As a result, they suffer from the ambiguity of correspondences between the camera images, which is a difficult problem to solve especially when free-form surfaces [33] are involved in the scene. However, to avoid this problem, active vision may be adopted. Structured light or pattern projection systems have been used for this purpose. To reconstruct precisely a 3D shape with such a system, the active vision system consisting of a projector and a camera needs to be carefully calibrated [34, 35]. The traditional calibration procedure normally involves two separate stages: camera calibration and projector calibration. These individual calibrations are carried out off-line and they have to be repeated each time the setting is changed. As a result, the applications of active vision systems are limited, since the system configuration and parameters must be kept unchanged during the entire measurement process.

For active vision systems using structured-light, the existing calibration methods are mostly based on static and manual operations. The available camera self-calibration methods cannot be applied directly to structured-light systems as they need more than two views for the calibration. Recently, there has been some work on self-calibration [36]-[40] of structured-light systems. Fofi et al. [36] investigated the self-calibration of structured-light systems, but the work was based on the assumption that a square projected onto a planar surface will most generally give a quadrilateral shape in the form of a parallelogram".

Jokinen [37] studied a self-calibration method based on multiple views, where the object is moved by steps. Several maps were acquired for the registration and calibration. The limitation of this method is that the object must be placed on a special device so that it can be precisely moved.

Using a cube frame, Chu et al. [38] proposed a calibration free approach for recovering unified world coordinates.

Chen and Li [39, 40] recently proposed a self-recalibration method for a structured-light system allowing changes in the system configuration in two degrees of freedom.

In some applications, such as seabed metric reconstruction with an underwater robot, when the size or distance of the scene changes, the configuration and parameters of the vision system need to be changed to optimize the measurement. In such applications, uncalibrated reconstruction is needed. In this regard, efforts have been made in recent research. Fofi et al [41] studied the Euclidean reconstruction by means of an uncalibrated structured light system with a colour-coded grid pattern. They modeled the pattern projector as a pseudo camera and then the whole system as a two-camera system. Uncalibrated Euclidean reconstruction was performed with varying focus, zoom and aperture of the camera. The parameters of the structured light sensor were computed according to the stratified algorithm [26], [42]. However, it was not clear how many of the parameters of the camera and projector could be self-determined in the uncalibrated reconstruction process.

Thus, there is a need for a reconfigurable vision system and method for 3D measurement and reconstruction in which recalibration may be conducted without having to use special calibration apparatus as required by traditional calibration methods.

SUMMARY OF THE INVENTION

In general terms, the present invention provides a method and system for the measurement and surface reconstruction of a 3D image of an object comprising projecting a pattern onto the surface to be imaged, examining distortion produced in the pattern by the surface, converting for example by a triangulation process the distortions produced in the pattern by the surface to a distance representation representative of the shape of the surface. The surface shape of the 3D image may then be reconstructed, for example electronically such as digitally, for further processing.

In a preferred embodiment, the object is firstly sliced into a number of cross section curves, with each cross-section to be reconstructed by a closed B-spline curve. Then, a Bayesian information criterion (BIC) is applied for selecting the control point number of B-spline models. Based on the selected model, entropy is used as the measurement of uncertainly of the B-spline model to predict the information gain for each cross section curve. After obtaining the predicted information gain of all the B-spline models, the information gain of the B-spline models may be mapped into a view space. The viewpoint that contains maximal information gain for the object is then selected as the Next Best View. A 3D surface reconstruction may then be carried out.

An advantage of one or more preferred embodiments of the invention system is that the 3D information of a scene may be acquired at high speed by taking a single picture of the scene.

With this method, a complex 3D shape may be divided into a series of cross section curves, each of which represents the local geometrical feature of the object. These cross section curves may be described by a set of parametric equations. For reconstruction purposes using parametric equations, the most common methods include spline function (e.g. B-spline) [43], implicit polynomial [44], [45] and superquadric (e.g. superellipsoid). [46]. Compared with implicit polynomial and superquadric, B-spline has the following main advantages:
1. Smoothness and continuity, which allows a curve to consist of a concatenation of curve segments, yet be treated as a single unit;
2. Built-in boundedness, a property which is lacking in implicit or explicit polynomial representations whose zero set can shoot to infinity;
3. Parameterized representation. which decouples the x, y coordinates enabling them to be treated separately;

BRIEF DESCRIPTION OF THE DRAWINGS

Preferred embodiments of the invention will now be described by way of example and with reference to the accompanying drawings, in which:

FIG. 1 is a schematic block diagram of an active vision system according to an embodiment of the invention;

FIG. 2 is a schematic diagram showing the geometrical relationships between the components of the vision system of the embodiment of FIG. 1;

FIG. 3 is a diagram illustrating the illumination projection in the embodiment of FIG. 1;

FIG. 4 is a block schematic illustrating the color encoding for identification of coordinates on the projector of the system of FIG. 1;

FIG. 5a illustrates an ideal step illumination curve of the blur area and its irradiant flux in the system of FIG. 1;

FIG. 5b illustrates a graph of illumination against distance showing an out of focus blur area and an irradiated area for the system of FIG. 1;

FIG. 6 illustrates a graph of illumination against distance showing the determination of the blur radius for the system of FIG. 1;

FIG. 7 illustrates a graph of the variation with distance of the point spread function showing the determination of the best-focused location;

FIG. 8 is a schematic diagram of an apparatus incorporating the system of FIG. 1;

FIG. 9 is a flow diagram of a view planning strategy according to an embodiment of the invention;

FIG. 10 is a flow diagram of information entropy calculation for viewpoint planning according to an embodiment of the invention;

FIG. 11a is a schematic illustration of a view space with Q=16, and

FIG. 11b is a schematic illustration of a viewpoint representation.

DETAILED DESCRIPTION OF PREFERRED EMBODIMENTS

FIG. 1 shows an active vision system according to a preferred embodiment of the invention. The system comprises an LCD projector 1 adapted to cast a pattern of light onto an object 2 which is then viewed by a camera and processor unit 3. The relative position between the projector 1 and the camera in the camera and processing unit 3 has six degrees of freedom (DOF). When a beam of light is cast from the projector 1 and viewed obliquely by the camera, the distortions in the beam line may be translated into height variations via triangulation if the system is calibrated including the relative position between the projector 1 and camera. The vision system may be self-recalibrated automatically if and when this relative position is changed. The camera and processor unit 3 preferably includes a processor stage, as well as the camera, for processing the observed distortions in the projected pattern caused by the object 2 and associated data and for enabling and carrying out reconstruction. In a further preferred embodiment, the processor stage may be remotely located from the camera and may be connectable thereto to receive the data for processing and carrying out the reconstruction process.

FIG. 2 shows the geometrical relationship between the projector 1, the object 2 and the camera of the system of FIG. 1, and, in particular, the pattern projected by the projector 1 onto the object 2 and viewed by the camera 3.

For the camera, $$x_c = P_c w_c,$$

where $x_c = [\lambda x_c \, \lambda y_c \, \lambda]^T$ are the coordinates on the image sensor plane, $\lambda \in R$ is an uncertain scalar $w_c = [X_c \, Y_c \, Z_c \, 1]^T$ are the 3D coordinates of an object point from the view of the camera (FIG. 2), and $P_c$ is the 3×4 perspective matrix $$P_c = \begin{bmatrix} v_c & k_{xy} & x_c^0 & 0 \\ 0 & s_{xy}v_c & y_c^0 & 0 \\ 0 & 0 & 1 & 0 \end{bmatrix}_{3\times 4}.$$

where $v_c$ is the distance between image plane and camera optical center, $s_{xy}$ is the ratio between the horizontal and vertical pixel cell sizes, $k_{xy}$ represents the placement perpendicularity of the cell grids, and $(x_c^0, y_c^0)$ is the center offset on the camera sensor.

Similarly, for the projector, $$x_p = P_p w_p,$$

where $x_p = [\kappa y_p \; \kappa y_p \; \kappa]^T$ are the coordinates on the projector plane, $\kappa \in R$ is also an uncertain scalar, $w_p = [X_p \; Y_p \; Z_p \; 1]^T$ are the 3-D coordinates of the object point based on the view of projector (see FIG. 2), and $P_p$ is the inverse perspective matrix of the projector $$P_p = \begin{bmatrix} v_p & 0 & x_p^0 & 0 \\ 0 & v_p & y_p^0 & 0 \\ 0 & 0 & 1 & 0 \end{bmatrix}_{3\times 4}.$$

The relationship between the camera coordinate system and projector coordinate system is $$w_p = M w_c = \begin{bmatrix} R & t \\ 0^T & 1 \end{bmatrix} w_c,$$

where M is a 4×4 matrix and t is the translation vector, $$t = s[t_x, t_y, t_z]^T.$$

Here s is a scaling factor to normalize $t_x^2 + t_y^2 + t_z^2 = 1$.

$$x_p = P_p w_p = P_p M w_c.$$

Let $$H = P_p M = \begin{bmatrix} h_1 \\ h_2 \\ h_3 \end{bmatrix}_{(3\times 4)},$$

where $h_1$, $h_2$, and $h_3$ are 4-dimensional vectors. We have $$\kappa x_p = h_1 w_c, \kappa y_p = h_2 w_c \text{ and } \kappa = h_3 w_c.$$

So $$(x_p h_3 - h_1) w_c = 0.$$

Then the following can be derived:

$$\begin{bmatrix} P_c \\ x_p h_3 - h_1 \end{bmatrix} w_c = \begin{bmatrix} x_c \\ 0 \end{bmatrix},$$

Denote $x_{c+} = [x_c^T, 0]^T$ and $$Q = \begin{bmatrix} P_c \\ x_p h_3 - h_1 \end{bmatrix} = \begin{bmatrix} q_{11} & q_{12} & q_{13} & 0 \\ 0 & q_{22} & q_{23} & 0 \\ 0 & 0 & 1 & 0 \\ q_{41} & q_{42} & q_{43} & q_{44} \end{bmatrix}.$$

The 3-dimensional world position of a point on the object surface can be determined by $$w_c = Q^{-1} x_{c+}.$$

As mentioned above, the relative positions of the camera 3 and the projector 1 may be changed dynamically during run-time of the system. As the camera (which is acting as a sensor) is reconfigurable during the run-time, it should be automatically recalibrated for 3-D perception tasks. Here the recalibration means that the camera (sensor) has been calibrated before installation in the system, but it should require calibrated again as the relative configuration changes. It is assumed for present purposes that the intrinsic parameters such as the focal lengths, scale factors, distortion coefficients will remain unchanged whereas the extrinsic parameters of the positions and orientations between the camera and projector have to be determined during the run-time of the system.

System Reconfiguration and Automatic Recalibration

The whole calibration of the structured light system of FIG. 1 may be divided into two parts. The first part concerns the calibration of the intrinsic parameters including the focal lengths and optical centers, this is called static calibration and may be performed off-line in a static manner. The second part deals with calibration of the extrinsic parameters of the relative position of the camera 3 and the projector 1, and this is hereinafter referred to as self-recalibration. The static calibration needs to be performed only once. The self-recalibration is thus more important and needs to be performed online whenever the system configuration is changed during a measurement task.

Once the perspective projection matrices of the camera 3 and the projector 1 relative to a global coordinate frame are computed from the static calibration, it is possible to obtain $P_c$ and $P_p$ which are the perspective projection matrices of the camera and the projector respectively relative to a global coordinate frame. The dynamic self-recalibration task requires the determination of the relative position M between the camera 3 and the projector 1. There are 6 unknown parameters, three for 3-axis rotation and three for 3-dimensional translation (as shown in FIG. 1).

For a point on an object surface, it is known that its coordinates on the camera's sensor plane $x_c = [\lambda x_c \; \lambda y_c \; \lambda]^T$ and on the projector's source plane $x_p = [\kappa x_p \; \kappa y_p \; \kappa]^T$ are related via the following:

$$x_p^T F x_c = 0,$$

where F is a 3×3 essential matrix:

$$F = sRS = s\begin{bmatrix} F_{11} & F_{12} & F_{13} \\ F_{21} & F_{22} & F_{23} \\ F_{31} & F_{32} & F_{33} \end{bmatrix},$$

Here R is a 3-axis rotation matrix and S is a skew-symmetric matrix $$S = \begin{bmatrix} 0 & -t_z & t_y \\ t_z & 0 & -t_x \\ -t_y & t_x & 0 \end{bmatrix},$$

based on the translation vector t.

The recalibration task is to determine the 6 independent parameters in R and t (FIG. 2). For each surface point, $x_p^T$-$Fx_c$=0 may be expressed as:

$$a_i^T f = 0.$$

Here $$f = [F_{11} F_{21} F_{31} F_{12} F_{22} F_{32} F_{13} F_{23} F_{33}]^T,$$

$$a_i = [x_c x_p, x_c y_p, x_c, y_c x_p, y_c y_p, y_c, x_p, y_p, 1]^T.$$

where ($x_c$, $y_c$) is the coordinates on the camera's sensor and ($x_p$, $y_p$) is the coordinates on the projector's LCD/DMD.

The projected patterns can be in black/white (b/w) or in colors. In either case, a coding method is in general needed. For b/w projections, gray codes can be used with the stripe light planes, which allows robust identifications of the stripe index (FIG. 3).

In a preferred embodiment of the invention, if an illumination pattern with colour-encoded grids is used, a cell's coordinates on the projector 1 can be immediately determined by the colours of adjacent neighbouring cells in addition to its own when projecting a source pattern. Via a table look-up, each cell's position can be uniquely identified. An example of such coded color pattern is shown in FIG. 4. The method of computing the values of blur diameters from an image has been proposed in [39,40] which is incorporated herein by reference. In a preferred embodiment, the system may comprise a Color Coded Pattern Projection system, a CCD camera, and a mini-platform for housing the components and providing the relative motion in 6DOF between the projector 1 and the camera 3. The method for automatic system recalibration and uncalibrated 3D reconstruction according to one or more preferred embodiments of the present invention may be implemented using such a system. With the adaptively adjustable sensor settings, this system will provide enhanced automation and performance for the measurement and surface reconstruction of 3D objects.

For n points observed, an n×9 matrix A can be obtained as the calibration data:

$$A = [a_1, a_2, \ldots, a_n]^T,$$

$$Af = 0,$$

If it is assumed that the structured light vision system has 6DOF in its relative pose, i.e. three position parameters and three orientation parameters, between the camera 3 and the projector 1. The focal lengths of the projector 1 and the camera 3 are assumed to have been obtained in a previous static calibration stage. The optical centers are fixed or can be described by a function of the focal length. The projector 1 generates grid patterns with horizontal and vertical coordinates so that the projector's LCD/DMD can be considered an image of the scene. The relative position between the camera 3 and the projector 1 may be described by $$\begin{bmatrix} X_p \\ Y_p \\ Z_p \end{bmatrix} = R \begin{bmatrix} X_c \\ Y_c \\ Z_c \end{bmatrix} - Rt.$$

If there are n (n>5) points observed on a plane and they do not lie on the same line, we have proved that the rank of the calibration matrix A is six, i.e.

Rank(A)=6.

If the following 6-by-6 matrix is considered which is a sub-matrix of matrix A, $$A_6 = [r_{a1}, r_{a2}, r_{a3}, r_{a4}, r_{a5}, r_{a6}]^T$$

where $r_{ai} = [1 x_{ci} y_{ci} x_{pi} y_{pi} x_{ci} y_{ci}]^T$ and $x_{ci}$ is the x value of the ith point projected on the camera coordinate system.

The matrix $A_6$ can be diagonalized by basic row-operations:

$$D(A_6) = \text{diag}(1, x_{c,2} - x_{c,1}, \ldots)$$

Since $x_{c,i} \neq x_{c,j}$, $y_{c,i} \neq y_{c,j}$, $x_{p,i} \neq x_{p,j}$, $y_{p,i} \neq y_{p,j}$, it can be proved that every element in $D(A_6)$ is non-zero if no four points of the sampled data lie on the same line. Therefore $\det(A_6) \neq 0$ and, Rank(A)≧Rank($A_6$)=6.

On the other hand, based on the projection model of the camera 3 and projector model 1, the coordinates of a surface point projected on the camera (sensor) may be given by (X/Z, Y/Z). For a point, ($x_c$,$y_c$) and ($x_p$,$y_p$) are related by:

$$Z_p \begin{bmatrix} x_p \\ y_p \\ 1 \end{bmatrix} = Z_c R \begin{bmatrix} x_c \\ y_c \\ 1 \end{bmatrix} - Rt.$$

where $Z_c$ and $Z_p$ are the depth values based on the view of the camera 3 and projector 1, respectively.

For the camera 3 and projector 1, the scene plane may be defined as follows:

$$Z = \frac{C_3}{1 - C_1 x - C_2 y}$$

Let $r_1$, $r_2$, and $r_3$ be the three rows in R, and then $$\frac{C_{3c}}{1 - C_{1c} x_p - C_{2c} y_p} \begin{bmatrix} x_p \\ y_p \\ 1 \end{bmatrix} = \frac{C_{3c}}{1 - C_{1c} x_c - C_{2c} y_c} \begin{bmatrix} r_1 \\ r_2 \\ r_3 \end{bmatrix} \begin{bmatrix} x_c \\ y_c \\ 1 \end{bmatrix} - \begin{bmatrix} r_1 \\ r_2 \\ r_3 \end{bmatrix} t,$$

which contains three equations and then, this equation may be considered to be equivalent to the following system:

$$\begin{cases} \tau_{11}x_c x_p + \tau_{12}x_c y_p + \tau_{13}x_p y_c + \tau_{14}y_c y_p + \\ \tau_{15}x_c + \tau_{16}x_p + \tau_{17}y_c + \tau_{18}y_p + \tau_{19} = 0 \\ \tau_{21}x_c x_p + \tau_{22}x_c y_p + \tau_{23}x_p y_c + \tau_{24}y_c y_p + \\ \tau_{25}x_c + \tau_{26}x_p + \tau_{27}y_c + \tau_{28}y_p + \tau_{29} = 0 \\ \tau_{31}x_c x_p + \tau_{32}x_c y_p + \tau_{33}x_p y_c + \tau_{34}y_c y_p + \\ \tau_{35}x_c + \tau_{36}x_p + \tau_{37}y_c + \tau_{38}y_p + \tau_{39} = 0 \end{cases}$$

or $$\Gamma a = 0,$$

where $\Gamma$ is a 3-by-9 matrix, a is described above, and $\{\tau_{ij}\}$ are constants.

It can be proved that there is no linear relationship among the above three equations, i.e. rank($\Gamma$)=3.

Considering 9 points as the calibration data, then matrix A is 9-by-9 in size. Since it is constrained by $\Gamma a=0$, the maximum rank of A is 6.

Therefore the rank of matrix A must be 6.

The general solution of the equation $a_i^T f=0$ has the form of $$f = \xi_1 f_1 + \xi_1 f_2 + \xi_1 f_3,$$

where $\xi_1$, $\xi_2$, and $\xi_3$ are real numbers, $f_i$ is a 9-dimensional vector, and $[f_1; f_2; f_3]$ is the null-basis of A.

Using singular value decomposition (SVD), we have $$B = svd(A^T A) = UDV^T,$$

where $A^T A$ is a 9×9 matrix, D is a non-decreasing diagonal matrix, and U and V are orthogonal matrices.

Then, $f_1$, $f_2$, and $f_3$ are the three vectors in V corresponding to the least eigenvalues. Theoretically, if there is no noise, matrix B is exactly as just described, i.e. of rank 6. In such a case, there would be three vanishing/singular values in the diagonal matrix D and the sum and or mean of squared errors (SSE and/or MSE) would be zero, since the vector f lies exactly in the null-space of B.

However, in a practical system, there maybe fewer than 3 singular values in the matrix D, as the matrix B can be perturbed. Since the data are from real measurements, B may have a rank of 7 or even higher. In such a case it is still possible to take the three column vectors from the matrix V as the basis vectors corresponding to the least values in D. It will still be the best in the sense B will have been tailored (with rank B>6) to some other matrix C with rank C=6 in such a way that C is the "nearest" to B among all the n-by-9 matrices with rank 6 in terms of the spectral norm and Frobenius norm.

Define $$f = Hk,$$

where $k = [\xi_1 \ \xi_2 \ \xi_3]^T$ and $H = [f_1 \ f_2 \ f_3] = [H_u^T, H_m^T, H_l^T]^T$. $H_u$, $H_m$, and $H_l$ are 3×3 matrices and each for three rows in H.

The above can be written as $$H_u k = F_{c1}, H_m k = F_{c2}, \text{ and } H_l k = F_{c3},$$

where $F_{c1}$, $F_{c2}$, and $F_{c3}$ are the three columns in F. Therefore, $$G = F^T F = \begin{bmatrix} k^T H_u^T H_u k & k^T H_u^T H_m k & k^T H_u^T H_l k \\ k^T H_m^T H_u k & k^T H_m^T H_m k & k^T H_m^T H_l k \\ k^T H_l^T H_u k & k^T H_l^T H_m k & k^T H_l^T H_l k \end{bmatrix}$$

As R is orthogonal, $F^T F$ can also be expressed as $$G = S^T R^T R S = S^T S = \begin{bmatrix} 1 - t_x^2 & -t_x t_y & -t_x t_z \\ -t_x t_y & 1 - t_y^2 & -t_y t_z \\ -t_x t_z & -t_y t_z & 1 - t_z^2 \end{bmatrix}.$$

The three unknowns of $k = [\xi_1 \ \xi_2 \ \xi_3]^T$ can be determined. The normalized relative position $t_n = [t_x \ t_y \ t_z]^T$ can then be solved:

$$\begin{cases} t_x = \pm \sqrt{1 - k^T H_u^T H_u k} \\ t_y = \pm \sqrt{1 - k^T H_m^T H_m k} \\ t_z = \pm \sqrt{1 - k^T H_l^T H_l k} \end{cases}$$

It should be noted that multiple solutions exist. In fact, if $[k \ t]^T$ is a solution of the system, $[\pm k \ \pm t]^T$ must also be the solutions. One of these solutions is correct for a real system setup. To find this, the re-projection method can be used.

When k and t are known, the rotation matrix R can be determined by $$R = \begin{bmatrix} r_1 \\ r_2 \\ r_3 \end{bmatrix} = \begin{bmatrix} F_{c1} \times t + (F_{c2} \times t) \times (F_{c3} \times t) \\ F_{c2} \times t + (F_{c3} \times t) \times (F_{c1} \times t) \\ F_{c3} \times t + (F_{c1} \times t) \times (F_{c2} \times t) \end{bmatrix}$$

where "×" is the cross product of two vectors.

Among the six unknown parameters, the five in R and $t_n$ have been determined so far and reconstruction can be performed but up to a scaling factor. The last unknown, s in t, may be determined here by a method using a constraint derived from the best-focused location (BFL). This is based on the fact that for a lens with a specified focal length, the object surface point is perfectly focused only at a special distance.

For an imaging system, the mathematical model for standard linear degradation caused by blurring and additive noise is usually described by $$g(i, j) = \sum_{k=1}^{m} \sum_{l=1}^{n} h(i-k, j-l) f(k, l) + n(i, j), \text{ or}$$

$$g = h \otimes f + n$$

where f is the original image, h is the point spread function, n is the additive noise, m×n is the image size. The operation "⊗" represents two-dimensional convolution. The blur can be used as a cue to find the perfectly focused distance.

For the projector in such a system, the most significant blur is the out-of-focus blur. This results from the fact that for a lens with a specific focal length the illumination pattern will be blurred on the object surface unless it is projected on the perfectly focused distance. Since the noise n only affects the accuracy of the result, it will not be considered in the following deduction. The illumination pattern on the source plane (LCD or DMD) to be projected is described as $$I_s(x) = \begin{cases} L_a, & \left(-\frac{T}{2} < x - 2nT < \frac{T}{2}\right), n \in N \\ 0, & \text{otherwise} \end{cases},$$

where T is the stripe width of the source pattern.

The scene irradiance caused by a light source is inversely proportional to the square of the distance from the light source. On the other hand, the image intensity on the camera sensor is independent of the scene distance and is only proportional to the scene irradiance. Therefore, the image intensity can be described as $$I = \frac{C_c C_l}{l^2},$$

where $C_c$ is the sensing constant of the camera and $C_l$ is the irradiant constant of light projection. They are related to many factors, such as the diameter of sensor's aperture, the focal length, and properties of surface materials.

Assume that the intensity at the point where the best-focused plane intersects the principal axis of the lens is $l_0$ (x=0, z=$z_0$), where $z_0$ is the best-focused distance. That is $$l_0 = \frac{C_c C_l}{(z_0 + v_p)^2},$$

where $v_p$ is the focal length, i.e. the distance between the source plane and optical center of the projector lens.

Consider a straight-line in the scene projected on the X-Z coordinate system:

$$z = c_1 x + c_0.$$

For an arbitrary point, we have $l = \sqrt{x^2 + (z+v_p)^2}$ and thus $$I = \frac{(z_0 + v_p)^2 I_0}{l^2}.$$

In the view of the projector, when the illumination pattern casts on a line, the intensity distribution becomes nonlinear and is given by $$I_i(x) = \frac{(z_0 + v_p)^2}{(z + v_p)^2 + x^2\left(1 + \frac{v_p}{z}\right)^2} I_0, \quad (8)$$

$$\left(-\frac{T}{2} < \frac{v_p}{z} x - 2nT < \frac{T}{2}\right), n \in N.$$

Transforming the x-axis to align with the observed line, we have:

$$x_l = \sqrt{1 + c_1^2} x.$$

The above gives $$I_i(x_l) = \frac{(z_0 + v_p)^2}{\left[1 + \left(\frac{c_2 x_l}{c_2 x_l + c_0}\right)^2\right][(c_2 + 1)x_l + c_0]^2} I_0,$$

where $c_2 = \frac{c_1}{\sqrt{1 + c_1^2}}$.

The illumination will be blurred unless it is projected on a plane at the perfectly focused distance:

$$z_0 = \frac{v_p f_p}{v_p - f_p},$$

where $f_p$ is the intrinsic focus length of the projector. For all other points in the scene, the z-displacement of a surface point to the best-focused location is:

$$\Delta z = |z - z_0| = \left|z - \frac{v_p f_p}{v_p - f_p}\right|.$$

where $v_p$ is the distance to from the image plane to the optical center.

The corresponding blur radius is proportional to $\Delta z$:

$$\sigma = \frac{v_p - f_p}{v_p F_{num}} \Delta z,$$

where $F_{num} = \frac{f_p}{r}$ is the f-number of the lens setting.

For out-of-focus blur, the effect of blurring can be described via a point spread function (PSF) to account for the diffraction effect of light wave. A Gaussian model is normally used.

With our light stripes, the one-dimensional PSF is $$h_\sigma(x) = \frac{1}{\sqrt{2\pi} \sigma} e^{-\frac{x^2}{2\sigma^2}}.$$

The brightness of the illumination from the projector is the convolution of the ideal illumination intensity curve with the PSF blur model:

$$I(x) = I_i(x) \otimes h_\sigma(x) = \int_{-\infty}^{+\infty} I_i(u) h_\sigma(x - u) du.$$

The Fourier transform of the above is $$I_F(\omega) = I_F^i(\omega) H_\sigma(\omega), \quad (18)$$

where $H_\sigma(\omega)$ is the Fourier transform of the Gaussian function $$H_\sigma(\omega) = \int_{-\infty}^{+\infty} \frac{1}{\sqrt{2\pi}\,\sigma} e^{-\frac{x^2}{2\sigma^2}} e^{-j\omega x} dx = e^{-\frac{\sigma^2 \omega^2}{2}}.$$

Without significant loss of accuracy, $I_i(x)$ may be approximated by averaging the intensity on a light stripe to simplify the Fourier transform, $I_i(x)=\bar{I}(x)$. If a coordinate system with its origin at the center of the bright stripe is used, this intensity can be written as $$\bar{I}(x) = I_0 \left[ \varepsilon\left(x + \frac{T}{2}\right) - \varepsilon\left(x - \frac{T}{2}\right) \right],$$

where $\varepsilon$ is a unit step function.

The Fourier transform of the above is $$I_F^i(\omega) = I_0 T \frac{\sin\left(\frac{\omega T}{2}\right)}{\frac{\omega T}{2}} = I_0 T S_a\left(\frac{\omega T}{2}\right).$$

Since $l(x)$ is measured by the camera, its Fourier transform $l_F(\omega)$ can be calculated. Using integration, we have $$\int e^{-\frac{\sigma^2 \omega^2}{2}} d\omega = I_0 T \int \frac{I_F(\omega)}{S_a\left(\frac{\omega T}{2}\right)} d\omega.$$

The left side is found to be $$\text{Left} = \frac{\sqrt{2}}{\sigma} \int_{-\infty}^{+\infty} e^{-\left(\frac{\sigma\omega}{\sqrt{2}}\right)^2} d\left(\frac{\sigma\omega}{\sqrt{2}}\right) = \frac{\sqrt{2}\sqrt{\pi}}{\sigma}.$$

Therefore the blur radius can be computed by $$\sigma = \left[ \frac{I_0 T}{\sqrt{2\pi}} \int \frac{I_F(\omega)}{S_a\left(\frac{\omega T}{2}\right)} d\omega \right]^{-1}.$$

Neglecting the effect of blurring caused by multiple illumination stripes, we have the following theorem to determine the blur radius with low computational cost and high precision.

Theorem 1. With the projection of a step illumination on the object surface, the blur radius is proportional to the time rate flow of irradiant light energy in the blurred area:

$$\sigma = \frac{\sqrt{2\pi}}{I_0} S,$$

where $I_0$ is the ideal intensity and S is the area size as illustrated in FIG. 5$b$.

This means that the blur radius $\sigma[m]$ is proportional to the area size under the blurring curve: $\sigma = \sqrt{2\pi} S/I_0$. The time rate flow of radiant light energy, i.e. the irradiant power or irradiant flux $\Phi$ [watt], is also the area size S [watt] under the blurring curve (or surface, in the case of two-dimensional analysis) illustrated in FIG. 5$b$.

Therefore, we only need to compute the area size S for every stripe to determine the blur radius. In a simple way, the edge position (x=0) can be detected by a gradient method, and S is then determined by summating the intensity function from 0 to $x_1$. However, even using a sub-pixel method for the edge detection, errors are still considerable since $l(x)$ changes sharply near the origin.

To solve this problem, we propose an accurate method in the sense of energy minimization. As illustrated in FIG. 6, we have $$F_s(x_o) = S_1(x_o) + S_2(x_o)$$
$$= \frac{I_0}{\sqrt{\pi}} \int_{\frac{x_o}{\sqrt{2}\sigma}}^{+\infty} e^{-y^2} dy + I_0 - \frac{I_0}{\sqrt{\pi}} \int_{-\infty}^{\frac{x_o}{\sqrt{2}\sigma}} e^{-y^2} dy.$$

It can be proved that the derivative of the above function is $$F_s' \geq 0, \text{ if } x_o \geq 0,$$

where "=" holds if and only if $x_o=0$.

The same situation occurs when $x_o \leq 0$. Therefore, at $x_o=0$, we have $$S = \min(F_s)/2.$$

This means that the same quantity of light energy flows from $S_2$ to $S_1$. This method for computing S is more stable than traditional methods and it yields high accuracy.

Now the best-focused location can be computed by analyzing the blur information in an image. With Theorem 1, by integrating the blurring curve on each stripe edge, the blur radius $\sigma_i$ can be calculated. These blur radiuses are recorded as a set $$D = \{(i, \sigma_i) | i \in N\},$$

where i is the stripe index on the projector's source pattern.

The blur size is proportional to the displacement of a scene point from the BFL, $\sigma = k_i \Delta z$. Since the blur diameters are unsigned, a minimum value $\sigma_{min}$ in the data set D can be found. For a line in the scene, in order to obtain a straight line corresponding to the linearly changing depth in the scene, we separate D into two parts and apply linear best-fit to obtain two straight lines:

$$\sigma_l(x) = k_1 x + k_2 \text{ and } \sigma_r(x) = k_3 x + k_4.$$

Finding the intersection of the two lines gives a best-focused location (as shown in FIG. 7)

$$x_b = \frac{k_4 - k_2}{k_1 - k_3},$$

which corresponds to $\Delta z=0$ or $$z(x_b) = \frac{v_p f_p}{v_p - f_p}.$$

The corresponding coordinates on the image are $(x_b, y_b)$, where $y_b$ is determined according to the scanning line on the image.

From the above analysis, there exists a point which represents the best-focused location for a line in the scene. Now consider the blur distribution on a plane in the scene. This happens when we analyze multiple scan lines crossing the light stripes or when the source illumination is a grid pattern.

For a plane in scene, $z=c_1 x+c_2 y+c_3$, the blur radius is $$\sigma(x, y) = \frac{v_p - f_p}{v_p F_{num}} \left| z - \frac{v_p f_p}{v_p - f_p} \right|$$

$$= \left| \frac{(v_p - f_p)(c_1 x + c_2 y + c_3) - v_p f_p}{v_p F_{num}} \right|.$$

The best focused locations form a straight line which is the intersection of two planes. A valley line can be found since the blur radius is unsigned.

For a freeform surface in the scene, the best-focused location can be determined by extending the above method making some minor modifications. For each light stripe, we can also compute its blur diameter and obtain a pair $(Z_{ri}, \sigma_i)$, where $i \in N$ is the stripe index and $z_{ri}$ $i \in [0, 1]$ is its relative depth in the camera view. Plotting these pairs in a coordinate system with $\sigma$ as the vertical axis and $z_r$ as the horizontal axis, we can also find a valley to be the best focused distance, $z_{rb}$.

For the point with minimum blur value, i.e. the best-focused location ($\Delta z = 0$), is constrained by $$Z_c \begin{bmatrix} x_c \\ y_c \\ 1 \end{bmatrix} - s \begin{bmatrix} t_x \\ t_y \\ t_z \end{bmatrix} = \frac{v_p f_p}{v_p - f_p} R^{-1} \begin{bmatrix} x_p \\ y_p \\ 1 \end{bmatrix} = \begin{bmatrix} b_1 \\ b_2 \\ b_3 \end{bmatrix},$$

The scaling factor s can thus be determined:

$$s = \frac{x_c b_2 - y_c b_1}{y_c t_x - x_c t_y}.$$

The procedures for self-recalibration of a structured light vision sensor are given as follows:
Step 1: projecting grid encoded patterns onto the scene;
Step 2: determining $t_n$ and R for 5 unknowns;
Step 3: computing the blur distribution and determining the best-focused location;
Step 4: determining the scaling factor s; and
Step 5: combining the relative matrix for 3-D reconstruction.

The method presented here automatically resolves six parameters of a color-encoded structured light system. When the internal parameters of the camera 3 and the projector 1 are known via pre-calibration, the 6 DOF relative placement of the active vision system can be automatically recalibrated with neither manual operations nor assistance of a calibration device. This feature is very important for many situations when the vision sensor needs to be reconfigured online during a measurement or reconstruction task.

The method itself does not require the six parameters all to be the external ones. In fact, only if the number of unknown parameters of the system does not exceed six, the method can still be applied. For example, if the two focal lengths, $v_c$ and $v_p$, are variable during the system reconfiguration and the relative structure has 4DOFs, we may solve them in a similar way, by replacing the matrix F by $F=(P_c^{-1})^T RSP_p^{-1}$ and modifying the decomposition method accordingly.

When the unknown parameters exceed six, the above-described method may not solve them directly. However, a 2-step method may be used to solve this problem. That is, before the internal parameters are reconfigured, we take an image firstly to obtain the 6DOF external parameters. Then after changing the sensors' internal parameters, we take an image again to recalibrate them.

Special features of a method according to a preferred embodiment of the invention the invented method include:
The single image based recalibration allows measurement or reconstruction to be performed immediately after reconfiguration in the software, without requiring any extra requirement.

Metric measurement of the absolute geometry of the 3D shape may be obtained by replacing $r(x_b, y_b)$ with $z_{rb}$. This is different from most of the currently available conventional methods where the 3D reconstruction supported is up to a certain transformation.

Automatic Viewpoint Planning

To obtain a complete 3D model of an object 2 with the vision system as shown in FIG. 1, multiple views may be required, e.g. via robot vision as shown in FIG. 8 which illustrates the components of FIG. 1 housed in a robot apparatus. The viewpoint planning is charged with the task of determining the position and orientation and system configuration parameters for each view to be taken. It is assumed for the purposes of this description that we are dealing with an unknown object, i.e. assuming no prior knowledge about the object model. It is also assumed here that the object is general free-form surfaced. The approach is preferably to model a 3D object via a series of cross section curves. These cross section curves can be described by a set of parametric equations of B-spline curves. A criterion is proposed to select the optimal model structure for the available data points on the cross section curve.

For object reconstructions, two conventional approaches are volume reconstruction and surface reconstruction. The volume based technique is concerned with the manipulation of the volumetric objects stored in a volume raster of voxels. Surface reconstruction may be approached in one of the two ways: 1) representing the surface with a mosaic of flat polygon titles, usually triangles: and 2) representing the surface with a series of curved patches joined with some order of continuity. However, as mentioned above, a preferred reconstruction method for embodiments of the present invention is to model a 3D object via a series of cross section curves.

Model Selection for Reconstruction

The object 2 is sliced into a number of cross section curves, each of which represents the local geometrical features of the object. These cross section curves may be described by a set of parametric equations. For reconstruction of cross section curves, compared with implicit polynomial [47] and superquadric, B-spline has the following main advantages:

1) Smoothness and continuity, which allows any curve to be composed of a concatenation of curve segments and yet be treated as a single unit, 2) Built-in boundedness. a property which is lacking in implicit or explicit polynomial representation whose zero set can shoot to infinity; and 3) Parameterized representation, which decouples the x, z coordinates to be treated separately.

2.1 Closed B-Spline Curve Approximation

A closed cubic B-spline curve consisting of n+1 curve segments may be defined by $$p(t) = \sum_{j=0}^{n+3} B_{j,4}(t) \cdot \Phi_j \quad (1)$$

where p(t)=[x(t), z(t)] is a point on B-spline curve with location parameter t. In this section we use the chord length method for parameterization. In (1), $B_{j,4}(t)$ is the jth normalized cubic B-spline basis function, which is defined over the uniform knots vector $$[u_{-3}, u_{-2}, \ldots, U_{n+4}] = [-3, -2, \ldots, n+4]$$

In addition, the amplitude of $B_{j,4}(t)$ is in the range of (0.0, 1.0), and the support region of $B_{j,4}(t)$ is compact and nonzero for t∈[$u_j$, $u_{j+4}$]. The $(\Phi_j)_{j=0}^{n+3}$ are cyclical control points satisfying the following conditions:

$$\Phi_{n+1} = \Phi_0, \Phi_{n+2} = \Phi_1, \Phi_{n+3} = \Phi_2$$

By factorization of the B-spline model, the parameters of B-spline model can be represented as:

$$[\Phi_x^\tau, \Phi_z^\tau]^\tau = [\Phi_{x0}, \ldots \Phi_{xn}, \Phi_{z0}, \ldots \Phi_{zn}]^\tau$$

For a set of m data points $r=(r_i)_{i=1}^m=([x_i, y_i])_{i=1}^m$, let $d^2$ be the sum of the squared residual errors between the data points and their corresponding points on the B-spline curve, ie $$d^2 = \sum_{i=1}^m \|r_i - p(t_i)\|^2$$

$$= \sum_{i=1}^m \left[x_i - \sum_{j=0}^{n+3} B_{j,4}(t_i) \cdot \Phi_{xj}\right]^2 + \sum_{i=1}^m \left[y_i - \sum_{j=0}^{n+3} B_{j,4}(t_i) \cdot \Phi_{yj}\right]^2$$

From the cyclical condition of control points in the equation $\Phi_{n+1}=\Phi_0, \Phi_{n+2}=\Phi_1, \Phi_{n+3}=\Phi_2$, there are only n+1 control points to be estimated. The LS estimation method of the n+1 control points may be obtained from the curve points by minimizing $d^2$ above with respect to $\Phi=[\Phi_x^T, \Phi_y^T]^T = [\Phi_{x0}, \ldots \Phi_{xn}, \Phi_{y0}, \ldots, \Phi_{ym}]^T$.

The following estimation of $\Phi$ may then be obtained by factorization of the B-spline:

$$\left.\begin{array}{l}\Phi_x = [B^\tau B]^{-1} B^\tau x \\ \Phi_y = [B^\tau B]^{-1} B^\tau y\end{array}\right\} \quad (2)$$

where $$x = [x_1, \ldots, x_m]^\tau, y = [y_1, \ldots, y_m]^\tau$$

$$B = \begin{bmatrix} \bar{B}_{0,4}^1 + \bar{B}_{n+1,4}^1 & \bar{B}_{1,4}^1 + \bar{B}_{n+2,4}^1 & \bar{B}_{2,4}^1 + \bar{B}_{n+3,4}^1 & \cdots & \bar{B}_{n,4}^1 \\ \bar{B}_{0,4}^2 + \bar{B}_{n+1,4}^2 & \bar{B}_{1,4}^2 + \bar{B}_{n+2,4}^2 & \bar{B}_{2,4}^2 + \bar{B}_{n+3,4}^2 & \cdots & \bar{B}_{n,4}^2 \\ \vdots & \vdots & \vdots & & \vdots \\ \bar{B}_{0,4}^m + \bar{B}_{n+1,4}^m & \bar{B}_{1,4}^m + \bar{B}_{n+2,4}^m & \bar{B}_{2,4}^m + \bar{B}_{n+3,4}^m & \cdots & \bar{B}_{n,4}^m \end{bmatrix}$$

and $\bar{B}_{j,4}^i = B_{j,4}(\tau_i)$.

The chord length method may preferably be used for the parameterization of the B-spline. The chord length L of a curve may be calculated as follows:

$$L = \sum_{i=2}^{m+1} \|r_i - r_{i-1}\|$$

where $r_{m+1}=r_1$ for a closed curve. The $t_i$ associated with point $q_i$ may be given as:

$$t_i = t_{i-1} + \frac{\|r_i - r_{i-1}\|}{L} \cdot t_{max}$$

where $t_1=0$ and $t_{max}=n+1$

Model Selection with Improved BIC Criterion

For a given set of measurement data, there exists a model of optimal complexity corresponding to the smallest prediction (generalization) error for further data. The complexity of a B-spline model of a surface is related to its control point (parameter) number [43],[48]. If the B-spline model is too complicated, the approximated B-spline surface tends to over-fit noisy measurement data. If the model is too simple, then it is not capable of fitting the measurement data, making the approximation results under-fitted. In general, both over- and under-fitted surfaces have poor generalization capability. Therefore, the problem of finding an appropriate model, referred to as model selection, is important for achieving a high level generalization capability.

Model selection has been studied from various standpoints in the field of statistics. Examples include information statistics [49]-[51] Bayesian statistics [52]-[54], and structural risk minimization [55]. The Bayesian approach is a preferred model selection method. Based on posterior model probabilities, the Bayesian approach estimates a probability distribution over an ensemble of models. The prediction is accomplished by averaging over the ensemble of models. Accordingly, the uncertainty of the models is taken into account, and complex models with more degrees of freedom are penalized.

For a given set of models $\{M_k, k=1, 2, \ldots\}$ and data r, there exists a model of optimal model structure corresponding to smallest generalization error for further data and the Bayesian approach may be used to select the model with the largest (maximum) posterior probability to account for the data acquired so far.

In a first preferred method, the model M may be denoted by:

$$M = \arg_{M_k, k=1 \ldots k\,max} \max \{p(r|M_K)\}$$

where the posterior probability of model $M_k$ may be denoted by $$p(r|M_k) = \int_{\Phi_k} p(r|\Phi_k, M_k) p(\Phi_k|M_k) d\Phi_k$$

$$\cong (2\pi)^{d_k/2} |H(\hat{\Phi}_k)|^{-1/2} p(r|\hat{\Phi}_k, M_k) p(\hat{\Phi}_k|M_k)$$

Neglecting the term $p(\hat{\Phi}_k|M_k)$, the posterior probability of model $M_k$ becomes [11]:

$$M = \arg\max_{M_k, k=1,\ldots k_{max}} \left\{ \log p(r|\hat{\Phi}_k, M_k) - \frac{1}{2}\log|H(\hat{\Phi}'_k)| \right\}$$

where $\hat{\Phi}_k$ is the maximum likelihood estimate of $\Phi_k$, and $d_k$ is the parameter number of model $M_k$, $H(\hat{\Phi}_k)$ is the Hessian matrix of $-\log p(r|\Phi_k, M_k)$ evaluated at $\hat{\Phi}_k$.

The likelihood function $p(r|\hat{\Phi}_k, M_k)$ of closed B-spline cross section curves can be factored into x and y components as $$p(r|\hat{\Phi}_k, M_k) = p(x|\hat{\Phi}_{kx}, M_k) \cdot p(y|\hat{\Phi}_{ky}, M_k)$$

where $\hat{\Phi}_{kx}$ and $\hat{\Phi}_{ky}$ can be calculated by $$\begin{cases} \Phi_x = [B^T B]^{-1} B^T x \\ \Phi_y = [B^T B]^{-1} B^T y \end{cases}$$

Consider, for example, the x component. Assuming the residual error sequence to be zero mean and white Gaussian with variance $\sigma_{kx}^2(\hat{\Phi}_{kx})$, we have the following likelihood function:

$$p(x|\hat{\Phi}_{kx}, M_k) = \left(\frac{1}{2\pi\sigma_{kx}^2(\hat{\Phi}_{kx})}\right)^{m/2} \cdot \exp\left\{-\frac{1}{2\sigma_{kx}^2(\hat{\Phi}_{kx})}\sum_{k=0}^{m-1}[x_k - B_k\hat{\Phi}_{kx}]^2\right\}$$

and $\sigma_{kx}^2(\hat{\Phi}_{kx}, M_k)$ is estimated by:

$$\hat{\sigma}_{kx}^2(\hat{\Phi}_{kx}) = \frac{1}{m}\sum_{k=0}^{m-1}[x_k - B_k\hat{\Phi}_{kx}]^2$$

In a similar way, the likelihood function of the y component can also be obtained. The corresponding Hessian matrix insert $\hat{H}_k$ of $-\log p(r|\Phi_k, M_k)$ evaluated at $\hat{\Phi}_k$ may be denoted by:

$$H(\hat{\Phi}_k) = \begin{bmatrix} \frac{B^T B}{\hat{\sigma}_{kx}^2(\hat{\Phi}_{kx})} & 0 \\ 0 & \frac{B^T B}{\hat{\sigma}_{ky}^2(\hat{\Phi}_{ky})} \end{bmatrix}$$

By approximating $$\frac{1}{2}\log|H(\hat{\Phi}_k)|$$

by the asymptotic expected value of Hessian $$\frac{1}{2}(d_{kx} + d_{ky})\log(m),$$

we can obtain the BIC criterion for B-spline model selection as follows:

$$M = \arg\max_{M_k, k=1,\ldots k_{max}} \left\{ \begin{array}{l} -\frac{m}{2}\log\hat{\sigma}_{kx}^2(\hat{\Phi}_{kx}) - \frac{m}{2}\log\hat{\sigma}_{ky}^2(\hat{\Phi}_{ky}) \\ -\frac{1}{2}(d_{kx} + d_{ky})\log(m) \end{array} \right\}$$

where $d_{kx}$ and $d_{ky}$ are the number of control points in the x and y directions respectively, and m is the number of data points.

In the above equation, the first two terms $\hat{\sigma}_{kx}^2$ and $\hat{\sigma}_{ky}^2$ measure the prediction accuracy of the B-spline model, which increases with the complexity of the model.

In contrast, the second term decreases and acts as a penalty for using additional parameters to model the data. However, since the $\hat{\sigma}_{kx}^2$ and $\hat{\sigma}_{ky}^2$ only depend on the training sample for model estimation, they are insensitive when under fitting or over fitting occurs. In the above equation, only penalty terms prevent the occurrence of over-fitting. In fact, an honest estimate of $\sigma_{kx}^2$ and $\sigma_{ky}^2$ should be based on a re-sampling procedure. Here, the available data may be divided into a training sample and a prediction sample. The training sample is used only for model estimation, whereas the prediction sample is used only for estimating the prediction data noise $\hat{\sigma}_{kx}^2$ and $\hat{\sigma}_{ky}^2$. That is, the training sample is used to estimate the model parameter $\hat{\Phi}_k$ by: $\Phi_x=[B^T B]^{-1} B^T x$, $\Phi_y=[B^T B]^{-1} B^T y$, while the prediction sample is used to predict data noise $\sigma_k^2$ by $$\hat{\sigma}_{kx}^2(\hat{\Phi}_{kx}) = \frac{1}{m}\sum_{k=0}^{m-1}[x_k - B_k\hat{\Phi}_{kx}]^2.$$

In fact, if the model $\hat{\Phi}_k$ fitted to the training data is valid, then the estimated variance $\hat{\rho}_k$ from a prediction sample should also be a valid estimate of data noise.

In another preferred embodiment, for a given a set of models insert p51 and data r, the Bayesian approach selects the model with the largest posterior probability. The posterior probability of model $M_k$ may be denoted by:

$$p(M_k|r) = \frac{p(r|M_k)p(M_k)}{\sum_{L=1}^{k_{max}} p(r|M_L)p(M_L)}$$

where $p(r|M_k)$ is the integrated likelihood of model $M_k$ and $p(M_k)$ is the prior probability of model $M_k$. To find the model with the largest posterior probability, evaluate $$p(M_k|r) \text{ for } k=1,2,\ldots,k_{max}$$

and select the model that has the maximum $p(M_k|r)$, that is $$M = \arg\max_{M_k, k=1,\ldots k_{max}} \{p(M_k|r)\}$$

$$= \arg\max_{M_k, k=1,\ldots k_{max}} \left\{ \frac{p(r|M_k)p(M_k)}{\sum_{L=1}^{k_{max}} p(r|M_L)p(M_L)} \right\}$$

Here, we assume that the models have the same likelihood a priori, so that $p(M_k)=1/k_{max}$, $(k=1 \ldots k_{max})$. Therefore, the model selection in $$p(M_k \mid r) = \frac{p(r \mid M_k)p(M_k)}{\sum_{L=1}^{k_{max}} p(r \mid M_L)p(M_L)}$$

will not be affected by $p(M_k)$. This is also the case with $$\sum_{L=1}^{k_{max}} p(r \mid M_L)p(M_L)$$

since it is not a function of $M_k$. Consequently, the factors $p(M_k)$ and $$\sum_{L=1}^{k_{max}} p(r \mid M_L)p(M_L)$$

may be ignored in computing the model criteria.
Equation $$M = \arg\max_{M_k, k=1,\ldots k_{max}} \{p(M_k \mid r)\}$$
$$= \arg\max_{M_k, k=1,\ldots k_{max}} \left\{ \frac{p(r \mid M_k)p(M_k)}{\sum_{L=1}^{k_{max}} p(r \mid M_L)p(M_L)} \right\}$$

then becomes $$M = \arg\max_{M_k, k=1,\ldots k_{max}} \{p(r \mid M_k)\}$$

To calculate the posterior probability of model $M_k$, we need to evaluate the marginal density of data for each model $p(r|M_k)$ which requires multidimensional integration:

$$p(r \mid M_k) = \int_{\Phi_k} p(r \mid \Phi_k, M_k)p(\Phi_k \mid M_k)d\Phi_k$$

where $\Phi_k$ is the parameter vector for model $M_k$, $p(r|\phi_k, M_k)$ is the likelihood and $p(\Phi_k|M_k)$ is the prior distribution for model $M_k$.

In practice, calculating the multidimensional integration is very difficult, especially for obtaining a closed form analytical solution. The research in this area has resulted in many approximation methods for achieving this. The Laplace's approximation method for the integration appears to be a simple one and has become a standard method for calculating the integration of multi-variable Gaussians [53]. This gives:

$$p(r \mid M_k) = \int_{\Phi_k} p(r \mid \Phi_k, M_k)p(\Phi_k \mid M_k)d\Phi_k$$

-continued
$$\cong (2\pi)^{d_k/2} |H(\hat{\Phi}_k)|^{-1/2} p(r \mid \hat{\Phi}_k, M_k)p(\hat{\Phi}_k \mid M_k)$$

where $\hat{\Phi}_k$ is the maximum likelihood estimate of $\Phi_k$, $d_k$ denotes the number of parameters (control points for B-spline model) in model $M_K$, and $H(\hat{\Phi}_52$ is the Hessian matrix of $-\log p(r|\Phi_k,M_k)$ evaluated at $\hat{\Phi}_k$, $$H(\hat{\Phi}_k) = \frac{\partial^2 \log p(r \mid \Phi_k, M_k)}{\partial \Phi_k \partial \Phi_k^T}\bigg|_{\Phi_k=\hat{\Phi}_k}$$

This approximation is particularly good when the likelihood function is highly peaked around $\hat{\Phi}_k$. This is usually the case when the number of data samples is large. Neglecting the terms of $p(\hat{\Phi}_k|M_k)$ and using log in the calculation, the posterior probability of model $M_k$ becomes:

$$M = \arg\max_{M_k, k=1,\ldots k_{max}} \left\{ \log p(r \mid \hat{\Phi}_k, M_k) - \frac{1}{2}\log|H(\hat{\Phi}_k)| \right\}$$

The likelihood function $p(r|\hat{\Phi}_k,M_k)$ of a closed B-spline cross section curve may be factored into x and y components as $$p(r|\hat{\Phi}_k,M_k)=p(x|\hat{\Phi}_{kx},M_k)\cdot p(y|\hat{\Phi}_{ky},M_k)$$

where $\hat{\Phi}_{kx}$ and $\hat{\Phi}_{ky}$ may be calculated by $$\begin{cases} \Phi_x = [B^TB]^{-1}B^Tx \\ \\ \Phi_y = [B^TB]^{-1}B^Ty \end{cases}$$

Consider the x component. Assuming that the residual error sequence is zero mean and white Gaussian with a variance $\sigma_{kx}^2(\hat{\phi}_{kx})$. The likelihood function may be denoted as follows:

$$p(x \mid \hat{\Phi}_{kx}, M_k) = \left( \frac{1}{2\pi\sigma_{kx}^2(\hat{\Phi}_{kx})} \right)^{m/2}$$
$$\exp\left\{ -\frac{1}{2\sigma_{kx}^2(\hat{\Phi}_{kx})} \sum_{k=0}^{m-1} [x_k - B_k\hat{\Phi}_{kx}]^2 \right\}$$

with $\sigma_{kx}^2(\hat{\Phi}_{kx}, M_k)$ estimated by $$\sigma_{kx}^2(\hat{\Phi}_{kx}) = \frac{1}{m}\sum_{k=0}^{m-1} [x_k - B_k\hat{\Phi}_{kx}]^2$$

Similarly, the likelihood function of the y component may also be obtained. The corresponding Hessian matrix $\hat{H}_k$ of $-\log p(r|\Phi_k,M_k)$ Evaluated at $\hat{\Phi}_k$ is $$H(\hat{\Phi}_k) = \begin{bmatrix} \dfrac{B^T B}{\hat{\sigma}_{kx}^2(\hat{\Phi}_{kx})} & 0 \\ 0 & \dfrac{B^T B}{\hat{\sigma}_{ky}^2(\hat{\Phi}_{ky})} \end{bmatrix}$$

Approximating $$\frac{1}{2}\log|H(\hat{\Phi}_k)|$$

by the asymptotic expected value of Hessian insert $$\frac{1}{2}(d_{kx} + d_{ky})\log(m)$$

the Bayesian information criterion (BEC) for selecting the structure of a B-spline curve is $$M = \arg\max_{M_k, k=1,\ldots k_{max}} \left\{ \begin{array}{l} -\dfrac{m}{2}\log\hat{\sigma}_{kx}^2(\hat{\Phi}_{kx}) - \dfrac{m}{2}\log\hat{\sigma}_{ky}^2(\hat{\Phi}_{ky}) \\ -\dfrac{1}{2}(d_{kx} + d_{ky})\log(m) \end{array} \right\}$$

where $d_{kx}$ and $d_{ky}$ are the number of control points in x and y directions respectively, and m is the number of data points.

In the conventional BIC criterion as shown in the above equation, the first two terms measure the estimation accuracy of the B-spline model. In general, the variance $\hat{\sigma}_k^2$ estimated from $$\hat{\sigma}_{kx}^2(\hat{\Phi}_{kx}) = \frac{1}{m}\sum_{k=0}^{m-1}\left[x_k - B_k\hat{\Phi}_{kx}\right]^2$$

tends to decrease with the increase in the number of control points. The smaller the variance value in $\hat{\sigma}_k^2$, the bigger the value of the first two terms (as the variance is much smaller than one) and therefore the higher the order (i.e. the more control points) of the model resulting from $$M = \arg\max_{M_k, k=1,\ldots k_{max}} \left\{ \begin{array}{l} -\dfrac{m}{2}\log\hat{\sigma}_{kx}^2(\hat{\Phi}_{kx}) - \dfrac{m}{2}\log\hat{\sigma}_{ky}^2(\hat{\Phi}_{ky}) \\ -\dfrac{1}{2}(d_{kx} + d_{ky})\log(m) \end{array} \right\}$$

However, if too many control points are used, the b-spline model will over-fit noisy data points. An over-fitted B-spline model will have poor generalization capability. Model selection thus should achieve a proper tradeoff between the approximation accuracy and the number of control points of the B-spline model. With a conventional BIC criterion, the same data set is used for estimating both the control points of the B-spline model and the variances. Thus the first two terms in the above equation cannot detect the occurrence of over fitting in the B-spline model selected.

In theory, the third term in the above equation could penalize over-fitting as it appears directly proportional to the number of control points used. In practice, however, it may be noted that the effect of this penalty term is insignificant compared with that of the first two terms. As a result, the conventional BIC criterion is rather insensitive to the occurrence of over-fitting and tends to select more control points in the B-spline model to approximate the data point, which normally results in a model with poor generalization capability.

The reason for the occurrence of over-fitting in conventional BIC criterion lies in the way the variances $\sigma_{kx}^2$ and $\sigma_{ky}^2$ are obtained. A reliable estimate of $\sigma_{kx}^2$ and $\sigma_{ky}^2$ should be based on re-sampling of the data, in other words, the generalization capability of a B-spline model should be validated using another set of data points rather than the same data used in obtaining the model.

To achieve this, the available data may be divided into two sets: a training sample and a prediction sample. The training sample may be used only for model estimation, whereas the prediction sample may be used only for estimating data noise $\sigma_{kx}^2$ and $\sigma_{ky}^2$.

For a candidate B-spline model $M_k$ with $d_{kx}$ and $d_{ky}$ control points in the x and y directions, the BIC may be evaluated via the following steps:

1) Estimate the model parameter $\hat{\Phi}_k$ using the training sample by $$\begin{cases} \Phi_x = [B^T B]^{-1} B^T x \\ \Phi_y = [B^T B]^{-1} B^T y \end{cases}$$

2) Estimate the data noise $\sigma_k^2$ using the prediction sample by equation $$\hat{\sigma}_{kx}^2(\hat{\Phi}_{kx}) = \frac{1}{m}\sum_{k=0}^{m-1}\left[x_k - B_k\hat{\Phi}_{kx}\right]^2$$

If the model $\hat{\Phi}_k$ fitted to the training data is valid, then the estimated variance $\hat{\sigma}_k^2$ from the prediction sample should also be a valid estimate of the data noise. It may be seen that the data noise $\sigma_k^2$ estimated from the prediction sample may be more sensitive to the quality of the model than one directly estimated from a training sample, as the variance $\sigma_k^2$ estimated from the prediction sample may also have the capability of detecting the occurrence of over-fitting.

Thus, in one or more preferred embodiments, a Bayesian based approach may be adopted as the model selection method. Based on the posterior model probabilities, the Bayesian based approach estimates a probability distribution over an ensemble of models. The prediction is accomplished by averaging over the ensemble of models. Accordingly, the uncertainty of the models is taken into account, and complex models with more degrees of freedom are penalized. Given a set of models $\{M_k, k=1, 2, \ldots, k_{max}\}$ and data r, the Bayesian approach selects the model with the largest posterior probability. To find the model with the largest posterior probability, we evaluate $p(M_k|r)$ for $k=1, 2, \ldots, k_{max}$ and select the model that has the maximum $p(M_k|r)$, that is $$M = \arg\max_{M_k, k=1,\ldots k_{max}} \{p(M_k|r)\}$$

$$= \arg\max_{M_k, k=1,\ldots k_{max}} \left\{ \frac{p(r \mid M_k)p(M_k)}{\sum_{L=1}^{k_{max}} p(r \mid M_L)p(M_L)} \right\}$$

Assuming that the models have the same likelihood a priori, so that $p(M_k)=1/k_{max}$, $(k=1,\ldots,k_{max})$, the model selection will not be affected by $p(M_k)$. This is also the case with $$\sum_{L=1}^{k_{max}} p(r \mid M_L)p(M_L)$$

since it is not a function of $M_k$. Consequently, we have $$M = \arg\max_{M_k, k=1,\ldots k_{max}} \{p(r \mid M_k)\}$$

Using Laplace's approximation for calculating the integration of multi-variable Gaussians, we can obtain the Bayesian information criterion (BIC) for selecting the structure of B-spline curve $$M = \arg\max_{M_k, k=1,\ldots k_{max}} \left\{ \begin{array}{c} -\frac{m}{2}\log\hat{\sigma}^2_{kx}(\hat{\Phi}_{kx}) - \frac{m}{2}\log\hat{\sigma}^2_{ky}(\hat{\Phi}_{ky}) \\ -\frac{1}{2}(d_{ky}+d_{ky})\log(m) \end{array} \right\}$$

where $d_k$, and $d_k$, are the number of control points in x and y directions respectively, m is the number of data points.

Here we divide the available data into two sets: a training sample and a prediction sample. The training sample is used only for model estimation, whereas the prediction sample is used only for estimating data noise. For a candidate B-spline model with its control points, the BIC is evaluated via the following steps:

1) Estimate the model parameter using the training sample;
2) Estimate the data noise using the prediction sample.

If the model fitted to the training data is valid, then the estimated variances from the prediction sample should also be a valid estimate of the data noise. If the variances found from the prediction sample are unexpectedly large, we have reasons to believe that the candidate model fits the data badly. It is seen that the data noise estimated from the prediction sample will thus be more sensitive to the quality of the model than the one directly estimated from training sample, as the variance estimated from the prediction sample also has the capability of detecting the occurrence of over-fitting.

We further define an entropy function which measures the information about the model, given the available data points. The entropy can be used as the measurement of the uncertainty of the model parameter.

Uncertainty Analysis

In this section, we will analyze the uncertainty of the B-spline model for guiding data selection so that new data points will maximize information on the B-spline model's parameter $\Phi$. Here $\Phi_k$ is replaced by $\Phi$ to simplify the descriptions and to show that we may deal with the selected "best" B-spline model with $d_{kx}$ and $d_{ky}$ control points.

To obtain the approximate B-spline model, we will predict the distribution of the information gain about the model's parameter $\Phi$ along each cross section curve. A measure of the information gain will be obtained whose expected value will be maximal when the new measurement data are acquired. The measurement is based on Shannon's entropy whose properties make it a sensible information measure here. We will describe the information entropy of the B-spline model and how to use it to achieve maximal information gain about the parameters of the B-spline model $\Phi$.

Information Entropy of a B-spline Model

In a first preferred embodiment, given $\Phi$ and the data points $r(r_i)_{i=1}^m$ are assumed to be statistically independent, with Gaussian noise of zero mean and variance $\sigma^2$ the joint probability of $r=(r_i)_{i=1}^m$ may be denoted by $$p(r \mid \Phi) = \frac{1}{(2\pi\sigma^2)^{m/2}} \cdot \exp\left[-\frac{1}{2\sigma^2}(r - B \cdot \Phi)^T(r - B \cdot \Phi)\right]$$

The above equation has an asymptotic approximation representation defined by [27]

$$p(r \mid \Phi) \approx p(r \mid \hat{\Phi})\exp\left[-\frac{1}{2}(\Phi - \hat{\Phi})^T H_m(\Phi - \hat{\Phi})\right]$$

where $\hat{\Phi}$ is the maximum likelihood estimation of $\Phi$ given the data points and $H_m$ p53] is the Hessian matrix of $-\log p(r|\Phi)$ evaluated at $\hat{\Phi}$ given data points $r=(r_i)_{i=1}^m$. The posteriori distribution $p(\Phi|r)$ of the given data is approximately proportional to $$p(\Phi \mid r) \approx p(r \mid \hat{\Phi}) \cdot \exp\left[-\frac{1}{2}(\Phi - \hat{\Phi})^T H_m(\Phi - \hat{\Phi})\right] p(\Phi)$$

where the $p(\Phi)$ is the priori probability of the B-spline model parameters.

If the priori has a Gaussian distribution with mean $\hat{\Phi}$ and covariance $H_m^{-1}$, we have $$p(\Phi \mid r) \propto \exp\left[-\frac{1}{2}(\Phi - \hat{\Phi})^T H_m(\Phi - \hat{\Phi})\right]$$

From Shannon's information entropy, the conditional entropy of $p(\Phi|r)$ is defined by $$E_m(\Phi) = -p(\Phi|r) \cdot \log p(\Phi|r) d\Phi$$

If $p(\Phi|r)$ obeys Gaussian distribution, the corresponding entropy is [28]

$$E_m = \Delta + \frac{1}{2}\log(\det H_m^{-1})$$

where $\Delta$ is a constant.

The entropy measures the information about the B-spline model parameters, given data points $(r_1, \ldots, r_m)$. The more information about $\Phi$
the smaller the entropy will be. In this work, we use the entropy
as the measurement of the uncertainty of the model parameter $\Phi$. Thus, to minimize $E_m$, we will make det $H_m^{-1}$ as small as possible.

In a further preferred embodiment, for parameter $\Phi$, the joint probability of $r=(r_i)_{i=1}^m$ has an asymptotic approximation representation $$p(r|\Phi) \approx p(r|\hat{\Phi})\exp\left[-\frac{1}{2}(\Phi-\hat{\Phi})^T H_m (\Phi-\hat{\Phi})\right]$$

where $H_m$ is the Hessian matrix given points $r=(r_i)_{i=1}^m$.

Therefore, the posteriori distribution [seep1511] of given data may be approximately given as $$p(\Phi|r) \approx p(r|\hat{\Phi}) \cdot \exp\left[-\frac{1}{2}(\Phi-\hat{\Phi})^T H_m (\Phi-\hat{\Phi})\right] p(\Phi)$$

where the $p(\Phi)$ is the priori probability of B-spline model parameters. If we assume that the priori probability over the B-spline model parameters is initialized as uniform distribution in the interval which they lie in, we have $$p(\Phi|r) \propto \exp\left[-\frac{1}{2}(\Phi-\hat{\Phi})^T H_m (\Phi-\hat{\Phi})\right]$$

It is easy to confirm that if $p(\Phi|r)$ obeys Gaussian distribution, the correspond rig entropy is [12]

$$E_m = \Delta + \frac{1}{2}\log(\det H_m^{-1})$$

where $\Delta_m$ is the constant.

The entropy measures the information about B-spline model parameters, given data points, $(r_1, \ldots r_m)$.

Thus, in a preferred embodiment, we select the entropy as the measurement of uncertainty of the model parameter $\Phi$.

Information Gain

In order to predict the distribution of the information gain, a new data point $r_{m+1}$ may be assumed to have been collected along a contour. The potential information gain is determined by incorporating the new data point $r_{m+1}$. If we move the new point $r_{m+1}$ along the contour, the distribution of the potential information gain along the whole contour may be obtained.

To derive the relationship between the information gain and the new data point {seep54}, firstly we may assume that a new data point {seep54} has been collected. Then, let $P(\Phi|r_1, \ldots, r_m, r_{m+1})$ the probability distribution of model parameter $\Phi$ after a new point $r_{m+1}$ is added. Its corresponding entropy is $$E_{m+1} = \Delta + \frac{1}{2}\log(\det \hat{H}_{m+1}^{-1}).$$

The information gain then is $$\Delta E = E_m - E_{m+1} = \frac{1}{2}\log\frac{\det H_m^{-1}}{\det H_{m+1}^{-1}}$$

From $$H(\hat{\Phi}_k) = \begin{bmatrix} \frac{B^T B}{\hat{\sigma}_{kx}^2(\hat{\Phi}_{kx})} & 0 \\ 0 & \frac{B^T B}{\hat{\sigma}_{kx}^2(\hat{\Phi}_{ky})} \end{bmatrix}$$

the new data point $r_{m+1}$ will incrementally update the Hessian matrix as follows:

$$H_{m+1} \approx H_m + \begin{bmatrix} \frac{1}{\hat{\sigma}_x^2} \cdot \bar{B}_{m+1}^T \bar{B}_{m+1} & 0 \\ 0 & \frac{1}{\hat{\sigma}_y^2} \cdot \bar{B}_{m+1}^T \bar{B}_{m+1} \end{bmatrix}$$

where $\hat{\sigma}_{m+1}^2 \approx \hat{\sigma}_m^2 \cdot \bar{B}_{m+1}$ is defined by $$\bar{B}_{m+1} = [\bar{B}_{0,4}^{m+1} + \bar{B}_{n+1,4}^{m+1}, \bar{B}_{1,4}^{m+1} + \bar{B}_{n+2,4}^{m+1}, \ldots, \bar{B}_{n,4}^{m+1}].$$

The determinant of $H_{m+1}$ $$\det H_{m+1} \approx \det\left[I + \begin{bmatrix} \frac{1}{\hat{\sigma}_x^2} \cdot \bar{B}_{m+1}^T \bar{B}_{m+1} & 0 \\ 0 & \frac{1}{\hat{\sigma}_y^2} \cdot \bar{B}_{m+1}^T \bar{B}_{m+1} \end{bmatrix} H_m^{-1}\right] \cdot \det H_m$$

can be simplified to $$\det H_{m+1} \approx (1 + \bar{B}_{m+1} \cdot [B^T B]^{-1} \cdot \bar{B}_{m+1}^T)^2 \cdot \det H_m$$

Since $\det H^{-1} = 1/\det H$ $$\Delta E = E_m - E_{m+1} = \frac{1}{2}\log\frac{\det H_m^{-1}}{\det H_{m+1}^{-1}}$$

can be simplified to $$\Delta E = \log(1 + \bar{B}_{m+1} \cdot [B^T B]^{-1} \cdot \bar{B}_{m+1}^T)$$

Assuming that the new additional data point $r_{m+1}$ travels along the contour, the resulting potential information gain of the B-spline model will change according to $\Delta E$ above. In order to reduce the uncertainty of the model, it may be desirable to have the new data point at such location that the potential information gain attainable is largest. Therefore, after reconstructing the section curve by fitting partial data acquired from previous viewpoints, the Next Best Viewpoint should be selected as the one that senses those new data points which give the largest possible potential information gain for the B-spline model.

Thus, in order to predict the distribution of the information gain, we assume a new data point collected along a contour. The potential information gain is determined by incorporating the new data point. If we move the new point along the contour, the distribution of the potential information gain along the whole contour can be obtained. Now, we will derive the relationship between the information gain and the new data point.

As mentioned above, the new data points will incrementally update the Hessian matrix. In order to reduce the uncertainty of the model, we would like to have the new data point at such location that the potential information gain attainable is largest. Therefore, after reconstructing the section curve by fitting partial data acquired from previous viewpoints, the Next Best Viewpoint should be selected as the one that sense those new data points which give the largest possible potential information gain for the model.

Next Best View

The task in the view planning here is to obtain the visibility regions in the viewing space that contain the candidate viewpoints where the missing information about the 3D object can be obtained. The NBV should be the viewpoint that can give maximum information about the object. We need to map the predicted information gain to the view space for viewpoint planning. For a viewpoint, we say that a data point on the object is visible if the angle between its normal and the view direction is smaller than a breakdown angle of the sensor. The view space for each data point is the set of all possible viewpoints that can see it. The view space can be calculated via the following procedure:

1) Calculating the normal vector of a point on the object, using a least square error fitting of a local surface patch in its neighbourhood.
2) Extracting viewpoints from which the point is visible. These viewpoints are denoted as view space.

After the view space is extracted, we construct a measurement matrix. The components of the measurement matrix is given as $$m_{k,j} = \begin{cases} \langle n_k \cdot v_j \rangle & \text{if } r_k \text{ is visible to } v_j \\ 0 & \text{otherwise} \end{cases} \quad (30)$$

where $v_j$ is the direction vector of viewpoint $v_j$.

Then, for each view, we define a global measure of the information gain as the criterion to be summed over all visible surface points seen under this view of the sensor. This measure is defined by $$I_j(p_j) = \sum_{k \in R_j} m_{k,j} \cdot \Delta E_k$$

where $p_j$ contains the location parameters at a viewpoint, $\Delta E_k$ is the information gain at surface point $r_k$, which is weighted by $m_{k,j}$.

Therefore, the Next Best View p* is one that maximizes the information gain function of l(p)

$$(p^*) = \max I_j(p_j)$$

At the new viewpoint, another set of data is acquired, registered, and integrated with the previous partial model. This process is repeated until all data are acquired to build a complete model of the 3D surface. The terminating condition is defined via the information gain. When there are missing data, the information gain will have outstanding peaks where data are missing. When all data are obtained, there will be no obvious peaks. Rather, the information gain will appear noise like indicating that the terminating condition is satisfied.

In planning the viewpoint, we can also specify the vision system's configuration parameters. The configuration parameters can include optical settings of the camera and projector as well as the relative position and orientation between the camera and projector. The planning needs to satisfy multiple constraints including visibility, focus, field of view, viewing angle, resolution, overlap, occlusion, and some operational constraints such as kinematic reachability of the sensor pose and robot-environment collision. A complete cycle in the incremental modeling process is illustrated in FIG. 9. As shown in FIG. 9, in a first stage static calibration and first view acquisition is carried out. In a second stage, 3D reconstruction via a single view is performed. Next, 3D model registration and fusion is performed followed by the determination of a next viewpoint decision and terminating condition. Sensor reconfiguration follows this step and recalibration is performed. The process may then be repeated from the 3D reconstruction stage.

FIG. 10 shows a flow diagram of information entropy based viewpoint planning for digitization of a 3D object according to a preferred embodiment. In a first stage, 3D data is acquired from another viewpoint. Next, multiple view range images are registered. In the next stage, a B-spline model is selected and the model parameters of each cross section curve are estimated. Following this, the uncertainty of each cross section B-spline curve is analyzed and the information gain of the object is predicted. Next, information gain about the object is mapped into a view space. Candidate viewpoints are then evaluated and the NBV selected. The process may then repeated.

In a preferred embodiment, the candidate viewpoints may be represented in a tessellated spherical view space by subdividing recursively each triangular facet of an icosahedron. If we assume that view space is centered at the object, arid its radius is equal to a priori specified distance from the sensor to the object, each viewpoint may be represented by pan-tilt angles $\phi$ ([−180°, 180°]) and $\theta$ ([−90°, 90°]), denoted as $v(\theta,\phi)$.

For a viewpoint $v(\theta,\phi)$ on the object, it may be considered to be visible if the angle between its normal and the view direction is smaller than a breakdown angle $\alpha$ for the ranger sensor being used. The view space $V_k$ for each point $r_k$ (k=1, 2, ...) to be sensed by the range sensor is the set of all possible directions that can access to $r_k$. The view space $V_k$ may be calculated via the following procedure:

1) Calculating the normal vector $n_k$ of one point $r_k$ (k−=, 2, ...) using on the object, a least square error fitting of a 3×3 local surface patch in its neighborhood.
2) Extracting viewpoints from which $q_k$ is visible. These viewpoints are denoted as view space $V_k$.

After the view space $V_k$, (k=1, 2, ...), has been extracted, the measurement matrix may be constructed M The column vector $M_{R,J}$ of the measurement matrix corresponds to the set $R_j$ of points visible for viewpoint $v_j$ while the row vector $M_{k,v}$, corresponds to view space $V_k$ of the next best point $q_k$. The components $M_{kj}$ of l-by-w measure matrix may be defined as follows:

$$m_{k,j} = \begin{cases} \langle n_k \cdot v_j \rangle & \text{if } r_k \text{ is visible to } v_j \\ 0 & \text{otherwise} \end{cases}$$

where v; is the direction vector of viewpoint vj.

Then, for each view $v(\theta,\phi)$, the View Space visibility may be defined which may measure the global information gain $l(\theta,\phi)$ by $$I_j(\theta_j, \phi_j) = \sum_{k \in R_j} m_{k,j} \cdot \Delta E_k$$

where $\Delta E_k$ is the information gain at surface point $r_k$, which is weighted by $m_{k,j}$ Therefore, the Next Best View $(\theta^*,\phi^*)$ may be considered to be the one that maximizes the information gain function of $I(\theta,\phi)$ $$(\theta^*, \phi^*) = \max_{\theta_j, \phi_j} I_j(\theta_j, \phi_j)$$

View Space Representation

View space is a set of 3D positions where the sensor (vision system) takes measurements. If we assume that the 3D object is within the field of view and time depth of view of the vision system and the optical settings of the vision system are fixed, based on these assumptions, the parameters of the vision system to be planned are the time viewing positions of the sensor. As in the embodiment described above, in this embodiment, the candidate viewpoints are represented in a spherical viewing space. The viewing space is usually a continuous spherical surface. To reduce the number of viewpoints used in practice, it is necessary to discretize the surface by some kind of tessellation.

In general, there are two methods for tessellating a view sphere, namely latitude-longitude based methods and icosahedron based methods. For a latitude-longitude based tessellation, the distribution of viewpoints varies considerably from time poles to the equator. For this reason, uniformly segmented geodesic tessellation is widely used [29,30,31]. This method tessellates the sphere by subdividing recursively each triangular facet of the icosahedrons. Using the geodesic dome construction technique, the constructed dome contains $20 \times Q^2$ triangles and $10 \times Q^2+2$ vertices, where Q is the frequency of the geodesic division. The vertices of the triangles represent the candidate viewpoints.

By way of example, a rhombus-shaped array data structure may be used [30]. For example, we may calculate the view space with Q=16 as shown in FIG. 11(*a*). In addition, if we assume that the view space is centered around the object, and its radius is equal to a priori specified distance from the sensor to the object, as shown in FIG. 11(*b*), since the optical axis of the sensor passes through the center of the object, the viewpoint may be represented by pan-tilt angles $\phi([-180°, 180°])$ and $\theta([-90°, 90°])$.

According to the representation of the viewing space, the fundamental task in the view planning here is to obtain the visibility regions in the viewing space that contain the candidate viewpoints where the missing information about the 3D object can be obtained without occlusions. The NBV should be the viewpoint that can give maximum information about the object.

With the above view space representation, we can now map the predicted information gain to the view space for viewpoint planning. For a viewpoint $v(\theta,\phi)$, we say one data point on the object is visible if the angle between its normal and the view direction is smaller than a breakdown angle $\alpha$ of the sensor. The view space $V_k$ for each data point $r_k$, (k 1, 2, ... ) is the set of all possible viewpoints that can see $r_k$. The view space $V_k$ can be calculated via the following procedure:

1) Calculating the normal vector $n_k$ of a point $r_k$ (k=1, 2, ... ) on the object, using a least square error fitting of a 3×3 local surface patch in its neighborhood.
2) Extracting viewpoints from which $r_k$ is visible. These viewpoints are denoted as view space $V_k$.

After the view space $V_k$, (k=1, 2, ... ), is extracted, we construct a measurement matrix M. The components $m_{k,j}$ of an l-by-w measurement matrix may be given as $$m_{k,j} = \begin{cases} \langle n_k \cdot v_j \rangle & \text{if } r_k \text{ is visible to } v_j \\ 0 & \text{otherwise} \end{cases}$$

where $v_j$ is the direction vector of viewpoint $v_j$.

Then, for each view $v(\theta,\phi)$, we define a global measure of the information gain $I(\theta,\phi)$ as the criterion to be summed over all visible surface points seen under this view of the sensor. $I(\theta,\phi)$ is defined by $$I_j(\theta_j, \phi_j) = \sum_{k \in R_j} m_{k,j} \cdot \Delta E_k$$

where $\Delta E_k$ is the information gain at surface point $r_k$, which is weighted by $m_{k,j}$.

Therefore, the Next Best View $(\theta^*,\phi^*)$ is one that maximizes the information gain function of $I(\theta,\phi)$ $$(\theta^*, \phi^*) = \max_{\theta_j, \phi_j} I_j(\theta_j, \phi_j)$$

In summary, one or more preferred embodiments of the present invention provide a viewpoint planning method by reducing incrementally the uncertainty of a closed B-spline curve. Also proposed is an improved BIC criterion for model selection, which accounts for acquired data well. By representing the object with a series of relatively simple cross section curves, it is possible to define entropy as a measurement of uncertainty to predict the information gain for a cross section B-spline model. Based on that, it is possible to establish View Space Visibility and select the viewpoint with maximum visibility as the Next Best View.

One or more embodiments of the present invention may find particular application in the following fields but application of the invention is not to be considered limited to the following:

in reverse engineering, to obtain a digitized 3D data/model of a physical product;
human body measurements for the apparel industry or for tailor made clothing design;
advanced object recognition, product inspection and manipulation;
environment model construction for virtual reality;
as a 3D sensor for robotic exploration/navigation in clustered environments.

One or more preferred embodiments of the invention may have particular advantages in that by using encoded patterns projected over an area on the object surface, high speed 3D imaging may be achieved. Also, automated self-recalibration of the system may be performed when the system's configuration is changed or perturbed. In a further preferred embodiment, uncalibrated 3D reconstruction may be performed. Furthermore, in a preferred embodiment real Euclidean reconstruction of a 3D surface may be achieved.

It will be appreciated that the scope of the present invention is not restricted to the described embodiments. For example, whilst the embodiments have been described in terms of four sensors and four variable gain control components, a different number of such components may be used. Numerous other modifications, changes, variations, substitutions and equivalents will therefore occur to those skilled in the art without departing from the spirit and scope of the present invention.

The results of a series of experiments conducted in respect of a number of preferred embodiments according to the present invention are set out in the attached Schedule 1, the contents of which is incorporated herein in total. Furthermore, details of the application of a number of preferred embodiments of the present invention to uncalibrated Euchlidean 3D reconstruction using an active vision system according to an embodiment of the present invention is set out in Schedule 2, the contents of which is incorporated herein in total.

The invention claimed is:

1. A method for measuring and surface reconstruction of a 3D image of an object comprising:
   projecting a pattern onto a surface of an object to be imaged, wherein the step of projecting a pattern comprises projecting a colour-coded array pattern onto a surface of an object to be imaged; and wherein the step of projecting a pattern comprises projecting using a projector;
   viewing using a camera said pattern projected onto said surface and passing one or more signals from said camera representative of said pattern to said processing stage;
   arranging said camera and said projector to have 6 degrees of freedom relative to each other;
   examining in a processor stage distortion or distortions produced in said pattern by said surface;
   converting in said processor stage said distortion or distortions produced in said pattern by said surface to a distance representation representative of the shape of the surface; and
   reconstructing electronically said surface shape of said object;
   slicing in said processor stage said pattern as distorted by said surface into a number of cross section curves;
   reconstructing one or more of said cross-section curves by a closed B-spline curve technique;
   selecting a control point number of a plurality of B-spline models from said one or more curves;
   determining using entropy techniques representation of uncertainty in said selected plurality of B-spline models to predict an information gain for each cross section curve;
   mapping said information gain of said plurality of B-spline models into a view space; and
   selecting as a Next Best View a view point in said view space containing a maximum information gain for said object.

2. A method according to claim 1, wherein the step of projecting a pattern comprises projecting a pattern of rectangles onto a surface of an object to be imaged.

3. A method according to claim 1, wherein the step of projecting a pattern comprises projecting a striped pattern onto a surface of an object to be imaged.

4. A method according to claim 1, wherein the step of projecting a pattern comprises projecting a pattern of squares onto a surface of an object to be imaged.

5. A method according to claim 1, wherein the step of projecting a pattern comprises projecting a pattern using an LCD projector.

6. A method according to claim 1, wherein the step of viewing using the camera comprises viewing using a CCO camera.

7. A method according to claim 1, wherein said step of arranging comprises arranging said camera and said projector to have 3 linear degrees of freedom and 3 rotational degrees of freedom relative to each other.

8. A method according to claim 1, wherein said step of projecting comprises projecting using a projector, the method further comprising calibrating said projector prior to projecting said pattern.

9. A method according to claim 1, further comprising automatically reconfiguring one or more settings of said degrees of freedom if said one or more settings are varied during operation.

10. A method according to claim 9, wherein said step of reconfiguring comprises taking a single image of said surface for reconfiguring one or more external parameters of said camera and/or said projector.

11. A method according to claim 10, wherein said step of reconfiguring comprises taking a further image of said surface for reconfiguring one or more internal parameters of said camera and/or said projector.

12. A method according to claim 1, further comprising viewing said surface obliquely to monitor distortion or distortions in said pattern.

13. A method according to claim 1, wherein said step of reconstructing comprises reconstructing said surface from a single image.

14. A method according to claim 1, wherein said step of reconstructing comprises reconstructing said surface from two or more images taken from different positions if one or more portions of said image are obscured in a first image taken.

15. A method according to claim 1, wherein a Bayesian information criterion (BIC) is applied for selecting the control point number of said plurality of B-spline models from said one or more curves.

16. A method according to claim 1, further comprising terminating said method when said entire surface of said object has been examined and it has been determined that there is no further information to be gained from said surface.

17. A method according to claim 1, further comprising taking metric readings from said reconstructed surface shape.

18. A method according to claim 1, wherein said step of converting said distortion or distortions comprises converting using a triangulation process.

19. A system for measuring and surface reconstruction of a 3D image of an object comprising:
   a projector arranged to project a pattern onto a surface of an object to be imaged, wherein said pattern comprises a colour-coded array pattern;
   a camera arranged to view said pattern projected onto said surface; said camera being arranged to pass one or more signals representative of said pattern to said processor, wherein said projector and said camera are arranged to have 6 degrees of freedom relative to each other;
   a processor stage arranged to examine distortion or distortions produced in said pattern by said surface;
   said processor stage further being arranged to convert said distortion or distortions produced in said pattern by said surface to a distance representation representative of the shape of the surface; and
   said processor stage being arranged to reconstruct electronically said surface shape of said object;
   slice said processor stage said pattern as distorted by said surface into a number of cross section curves;
   reconstruct one or more of said cross-section curves by a closed B-spline curve technique;

select a control point number of a plurality of B-spline models from said one or more curves;

determine using entropy techniques representation of uncertainty in said selected plurality of B-spline models to predict an information gain for each cross section curve;

map said information gain of said plurality of B-spline models into a view space; and select as a Next Best View a view point in said view space containing a maximum information gain for said object.

20. A system according to claim 19, wherein said pattern comprises an array of rectangles.

21. A system according to claim 19, wherein said pattern comprises an array of stripes.

22. A system according to claim 19, wherein said pattern comprises an array of squares.

23. A system according to claim 19, wherein said projector comprises an LCD projector.

24. A system according to claim 19, wherein said camera comprises a CCO camera.

25. A system according to claim 19, wherein said projector and said camera are arranged to have 3 linear degrees of freedom and 3 rotational degrees of freedom relative to each other.

26. A system according to claim 19, wherein said projector is calibrated prior to projecting said pattern.

27. A system according to claim 19, wherein said processor is arranged to automatically reconfigure one or more settings of said degrees of freedom if said one or more settings are varied during operation.

28. A system according to claim 27, wherein processor IS arranged to reconfigure said one or more settings by taking a single image of said surface for reconfiguring one or more external parameters of said camera and/or said projector.

29. A system according to claim 28, wherein processor is arranged to reconfigure said one or more settings by taking a further image of said surface for reconfiguring one or more internal parameters of said camera and/or said projector.

30. A system according to claim 19, wherein said camera is arranged to view said surface obliquely to monitor distortion or distortions in said pattern.

31. A system according to claim 19, wherein said processor is arranged to reconstruct said surface from a single image.

32. A system according to claim 19, wherein said processor is arranged to reconstruct said surface from two or more images taken from different positions if one or more portions of said image are obscured in a first image taken.

33. A system according to claim 19, wherein said processor is arranged to apply a Bayesian information criterion (BIC) for selecting the control point number of plurality of B-spline models from said one or more curves.

34. A system according to claim 19, wherein said processor is arranged to terminate one or more processing steps when said entire surface of said object has been examined and it has been determined that there is no further information to be gained from said surface.

35. A system according to claim 19, wherein said processor is arranged to convert said distortion or distortions using a triangulation process.

36. An active vision system comprising the system according to claim 19.

* * * * *